US010146925B1

United States Patent
Rosenberg

(10) Patent No.: US 10,146,925 B1
(45) Date of Patent: Dec. 4, 2018

(54) MULTI-PERSON AUTHENTICATION AND VALIDATION CONTROLS FOR IMAGE SHARING

(71) Applicant: Knowledge Initiatives LLC, The Sea Ranch, CA (US)

(72) Inventor: Barr Rosenberg, The Sea Ranch, CA (US)

(73) Assignee: KNOWLEDGE INITIATIVES LLC, The Sea Ranch, CA (US)

( * ) Notice: Subject to any disclaimer, the term of this patent is extended or adjusted under 35 U.S.C. 154(b) by 0 days.

(21) Appl. No.: 15/977,394

(22) Filed: May 11, 2018

Related U.S. Application Data

(60) Provisional application No. 62/509,030, filed on May 19, 2017.

(51) Int. Cl.
*G06F 21/00* (2013.01)
*H04L 29/06* (2006.01)
*G06F 21/32* (2013.01)
*G06K 9/00* (2006.01)
*G06F 21/62* (2013.01)
*G06K 9/78* (2006.01)
*G06F 21/45* (2013.01)

(52) U.S. Cl.
CPC .............. *G06F 21/32* (2013.01); *G06F 21/45* (2013.01); *G06F 21/6209* (2013.01); *G06K 9/00288* (2013.01); *G06K 9/78* (2013.01)

(58) Field of Classification Search
CPC ...... G06F 21/32; G06F 21/45; G06F 21/6209; G06K 9/78; G06K 9/00288
See application file for complete search history.

(56) References Cited

U.S. PATENT DOCUMENTS

| | | | |
|---|---|---|---|
| 7,298,965 | B2 | 11/2007 | Balogh |
| 7,320,076 | B2 | 1/2008 | Caronni |
| 7,570,283 | B2 | 8/2009 | Sato et al. |
| 7,792,300 | B1 | 9/2010 | Caronni |
| 8,396,828 | B2 | 3/2013 | Ball et al. |
| 8,429,246 | B2 | 4/2013 | Pizano |
| 9,531,823 | B1 | 12/2016 | Suchland et al. |
| 2008/0229099 | A1 | 9/2008 | Kim et al. |
| 2010/0287611 | A1 | 11/2010 | Blom et al. |
| 2012/0066204 | A1 | 3/2012 | Ball et al. |

(Continued)

FOREIGN PATENT DOCUMENTS

| | | |
|---|---|---|
| GB | 2400514 A | 10/2004 |
| JP | 2001313006 A | 11/2001 |
| WO | WO-2011109865 A1 | 9/2011 |

OTHER PUBLICATIONS

Co-pending U.S. Appl. No. 15/470,741, filed Mar. 27, 2017.

*Primary Examiner* — Lisa C Lewis
(74) *Attorney, Agent, or Firm* — Wilson Sonsini Goodrich & Rosati

(57) ABSTRACT

Provided herein are methods and systems for multi-person authentication and validation systems for sharing of images. The multi-person authentication and validation system may identify the respective faces of one or more individuals captured in an image, and request authorization for sharing the image from the one or more individuals captured in the image. In some instances, the multi-person authentication and validation system may provide a different image version for sharing if at least one of the one or more individuals denies authorization.

20 Claims, 5 Drawing Sheets

(56) References Cited

U.S. PATENT DOCUMENTS

| | | |
|---|---|---|
| 2013/0011068 A1* | 1/2013 | Albouyeh ............... G06F 21/36 |
| | | 382/190 |
| 2013/0239230 A1 | 9/2013 | Herbach et al. |
| 2013/0297662 A1 | 11/2013 | Sharma et al. |
| 2013/0318347 A1 | 11/2013 | Moffat |
| 2013/0325824 A1 | 12/2013 | Shoens |
| 2013/0347025 A1 | 12/2013 | Prakash et al. |
| 2014/0032913 A1 | 1/2014 | Tenenboym et al. |
| 2014/0089265 A1 | 3/2014 | Talagala et al. |
| 2014/0372752 A1 | 12/2014 | Sallis |
| 2015/0106627 A1 | 4/2015 | Holman et al. |
| 2015/0163206 A1 | 6/2015 | McCarthy et al. |
| 2015/0169892 A1 | 6/2015 | Nord et al. |
| 2015/0180833 A1 | 6/2015 | Snow et al. |
| 2015/0281253 A1 | 10/2015 | Lords et al. |
| 2015/0286897 A1* | 10/2015 | Spaith ................ G06F 17/3028 |
| | | 382/224 |
| 2016/0004734 A1 | 1/2016 | Naryzhny et al. |
| 2016/0012082 A1 | 1/2016 | Choudhury |
| 2017/0099297 A1* | 4/2017 | Armer ................... H04L 63/105 |

\* cited by examiner

MULTI-PERSON AUTHENTICATION AND VALIDATION CONTROLS FOR IMAGE SHARING

CROSS-REFERENCE

This application claims the benefit of U.S. Provisional Patent Application No. 62/509,030, filed May 19, 2017, which application is entirely incorporated herein by reference.

BACKGROUND

Technology has become a ubiquitous feature of modern society. Mobile devices and web-based applications have become integral components of both the work environment and the personal environment. These changes have also presented challenges to individuals, communities, and nations around the world. For example, it has become difficult to protect personal information, and retain individual privacy. Privacy protection challenges are increasing as evidenced by the abundance of websites eager to collect and display personal information, the ubiquity of cameras on mobile devices, and the ease of sharing information that is later memorialized indefinitely by the Internet. To date, however, most technological approaches have sought to make data more easily accessible with less emphasis on the protection of data privacy and personal identity, especially for communication or the sharing of information among multiple individuals across a distance or over the network.

SUMMARY

Recognized herein is a need for enhanced methods of management of the sharing of data and information over a network, especially for data and information that require enhanced privacy and data security, such as personal information in an image. Provided herein are systems and methods to facilitate sharing of images, such as photos, that contain personal information (e.g., image of a face) of one or more individuals. An electronic multi-person authentication and validation system may be used for regulating and managing file sharing and file storage by requiring authentication, authorization, and/or confirmation from one or more individuals.

Provided herein are methods and systems for multi-person authentication and validation systems for the sharing of images. The multi-person authentication and validation system may identify the respective faces of one or more individuals captured in an image, and request authorization for sharing the image from the one or more individuals captured in the image. Alternatively, or in addition, authorization can be requested to perform another action, such as uploading, downloading, modifying, or deleting an image file. In some instances, the multi-person authentication and validation system may provide a different image version for sharing if at least one of the one or more individuals denies authorization.

In an aspect, provided is a method for using multi-person authentication and validation for sharing an image. The method can comprise: obtaining an image file of an image, wherein the respective faces of one or more individuals are captured in the image; identifying, with aid of one or more processors executing one or more facial recognition algorithms, the one or more individuals captured in the image; inserting a personal identity control key for each of the one or more individuals identified in the image into the image file; providing a control policy for the image file, wherein the control policy comprises one or more rules associated with the personal identity control key for each of the one or more individuals identified in the image; in accordance with the control policy, requesting authorization instructions from each of the one or more individuals identified in the image to perform an action on the image file; and allowing or denying the action to be performed on the image file based at least in part on authorization instructions received from at least one of the one or more individuals identified in the image.

In some embodiments, the method can further comprise processing the image file to create a first image file version, wherein the first image file version comprises a processed image in which a first facial image of a first user of the one or more individuals identified in the image is modified. For example, the first facial image can be pixelated in the first image file version. In another example, the resolution of the first facial image can be reduced in the first image file version.

In some embodiments, the method can further comprise, in accordance with the control policy, allowing or denying the action to be performed on the first image file version based at least in part on authorization instructions received from the first user.

In some embodiments, the one or more rules can provide that the action can be performed on the image when each of the one or more individuals identified in the image provides authorization instructions.

In some embodiments, the one or more rules can provide that the action can be performed on the image unless at least one of the one or more individuals identified in the image denies authorization.

In some embodiments, the method can further comprise requesting authentication of the one or more individuals identified in the image prior to requesting authorization instructions from the one or more individuals identified in the image.

In some embodiments, the method can further comprise requesting confirmation of identification from the one or more individuals identified in the image prior to requesting authorization instructions from the one or more individuals identified in the image.

In some embodiments, the authorization instructions can be provided by a first user of the one or more individuals identified in the image, wherein the first user selects a facial image of the first user in the image on a graphical user interface with a user interactive device to provide the authorization instructions.

In some embodiments, the action can be a sharing action.

In some embodiments, the action can be a downloading action.

In some embodiments, the action can be a deleting action.

In some embodiments, the method can further comprise modifying or cancelling the action performed on the image file based at least in part on authorization instructions received from at least one of the one or more individuals identified in the image.

In some embodiments, the method can further comprise, in accordance with the control policy, modifying or cancelling the action performed on the first image file version based at least in part on authorization instructions received from at least the first user.

In another aspect, provided is a computer-implemented system for sharing an image. The system can comprise one or more computer processors and a memory, communicatively coupled to the one or more computer processors, including instructions executable by the one or more processors to: obtain an image file of an image, wherein the respective faces of one or more individuals are captured in the image; execute one or more facial recognition algorithms to identify the one or more individuals captured in the image; insert a personal identity control key for each of the one or more individuals identified in the image into the image file; provide a control policy for the image file, wherein the control policy comprises one or more rules associated with the personal identity control key for each of the one or more individuals identified in the image; in accordance with the control policy, request authorization instructions from each of the one or more individuals identified in the image to perform an action on the image file; and allow or deny the action to be performed on the image file based at least in part on authorization instructions received from at least one of the one or more individuals identified in the image.

In some embodiments, the memory further comprises instructions executable by the one or more processors to process the image file to create a first image file version, wherein the first image file version comprises a processed image in which a first facial image of a first user of the one or more individuals identified in the image is modified. In some embodiments, the first facial image is pixelated in the first image file version or has a lower resolution in the first image file version than the resolution of the first facial image in the image file. In some embodiments, the memory further comprises instructions executable by the one or more processors to, in accordance with the control policy, allow, modify, or deny the action to be performed on the first image file version based at least in part on authorization instructions received from at least the first user.

In some embodiments, the one or more rules provide that (i) the action can be performed on the image when each of the one or more individuals identified in the image provides authorization instructions or (ii) the action can be performed on the image unless at least one of the one or more individuals identified in the image denies authorization.

In some embodiments, the memory further comprises instructions executable by the one or more processors to (i) request authentication of the one or more individuals identified in the image or (ii) request confirmation of identification from the one or more individuals identified in the image prior to requesting authorization instructions from the one or more individuals identified in the image, wherein the authentication or confirmation improves the accuracy of identification by the one or more facial recognition algorithms.

In some embodiments, the authorization instructions are provided by a first user of the one or more individuals identified in the image, wherein the first user selects a facial image of the first user in the image on a graphical user interface with a user interactive device to provide the authorization instructions.

In some embodiments, the action is a sharing action, downloading action, or deleting action.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
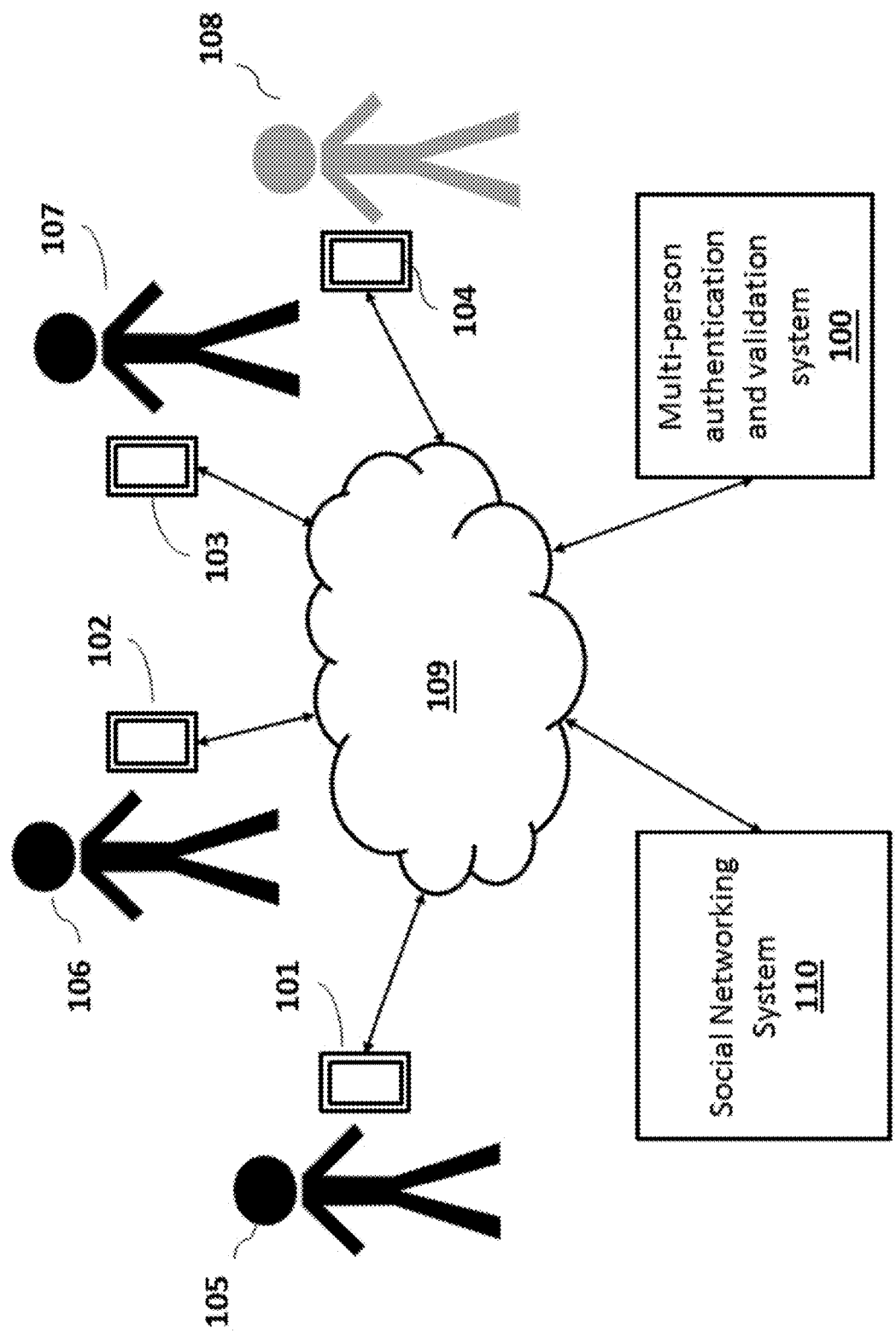
FIG. 1 shows a schematic illustration of a multi-person authentication and validation system communicating with multiple users.

Some of the key issues facing society today are privacy, control over personal content, and the abundance of impersonal forms of communication that are increasingly replacing personal communication. New tools and strategies for regulating and controlling information may be used to address some of these issues. New controls for protecting content may include methods, devices, and systems that establish authentication protocols configured to require authorization or acknowledgement from more than one individual.

Increasingly, information is exchanged over the air or over the Internet. To control, restrict or otherwise regulate sharing, modification, and deletion of files, new mechanisms must be developed that facilitate electronic multi-person validation when, for example, sensitive information is being handled. Such sensitive information can include an image, picture, photo, video, or other graphic representation or characterization of an individual. Frequently dismissed with the increasing abundance of social media and ease of sharing pictures is an individual's interest in preventing or otherwise controlling the distribution or sharing of the individual's own image. In some instances, a user may share a picture of one or more individuals over a network (e.g., Internet, intranet, extranet, etc.) without having obtained permissions from the individuals in the picture. This may be alarming, impolite, and in some instances, detrimental to the individuals whose respective images were shared without permission. In some instances, such unauthorized sharing may even infringe upon an individual's personality rights (e.g., right of publicity), which is the right of an individual to control the commercial use of his or her name, image, likeness, or other unequivocal aspects of one's identity.

It is difficult to provide secure protection for an image, especially once it has been released to a public or semi-public forum (e.g., social networking platform). For example, any image that is capable of being viewed is also capable of being copied: an image on a computer display can be captured by a screen capture (e.g., screenshot) of the display or by a photograph of the image on the display; an image that has been printed can be copied or photographed; and an image projected on a surface can also be photographed. There thus exists at least some inherent danger of misuse of any image that can be viewed on an electronic device. Beneficially, an image file may be modified or processed, for example, into another type of file format or other means of organizing and storing digital images. For example, the new file format may be referred to as a validated display image file (VDIF), and configured to control accessibility of the image file and prevent unauthorized sharing of the image file.

Provided are systems and methods for multi-person authentication and validation for the sharing of images. The systems and methods may require electronic means for controlling content and access to a database. The systems and methods can be computer implemented. Sharing of an image can be controlled or regulated by modifying and/or processing an image file of the image.

The systems and methods may control the sharing of an image during a multi-person authentication and validation session. The multi-person authentication and validation session may implement processes of 1) identification, 2) image processing, 3) authentication, and 4) validation. The term authentication as used herein may refer to the authentication of an individual's identity (e.g., such as to differentiate from a fraudulent individual asserting the identity of another individual). The term validation as used herein may refer to the validation of whether mechanisms that control or regulate an action (e.g., sharing, uploading, editing, downloading, deleting, etc.) have been satisfied. For example, the validation of an action may involve certain rules or conditions that must be satisfied in order for such action to proceed. For example, the validation of a sharing of a photo may require unanimous or partial authorization by one or more users identified in the photo. The term authorization as used herein may refer to instructions that can be given by an individual, wherein the instructions may be directed to one or more actions that can be performed on the disclosed system.

A multi-person authentication and validation system can be capable of identification. The system can be configured to reliably identify an individual from the graphics in an image, such as via facial recognition technology or from other information. For example, the system can identify an individual from the graphics in an image via user tagging and/or labelling. The image can be a picture, photo, video, or other graphic representation or characterization.

The multi-person authentication and validation system can be capable of image processing. The system can be configured to process an image file of the image, such as by inserting the image file with personal identity control keys for each individual identified in the image (e.g., identified via facial recognition). A unique personal identity control key can be associated with the personal identity of each individual. The system may assign a policy (e.g., control policy) to the image file. In some cases, the policy can lock the image file from one or more select actions (e.g., sharing, uploading, editing, downloading, etc.) until certain rules and/or conditions are satisfied. In some cases, the system can process the image file to redact or modify at least some data or information (e.g., lowering resolution, covering one or more parts, cropping one or more parts, pixelating one or more parts, etc.) in the image file and allow future actions (e.g., sharing, uploading, editing, downloading, etc.) to be performed only on or with the processed image file until certain rules and/or conditions in the policy are satisfied. The image file may be in one or more image file formats, such as, but not limited to, JPEG, Exif, TIFF, GIFF, BMP, PNG, PPM, PGM, HDR raster formats, BPG, or any other standardized means of organizing and storing digital images. The image processing capabilities of the disclosed system may also include modifying one or more file formats listed above to create one or more new file formats. For example, a VDIF file format, which includes personal identity control keys, may be created by the disclosed multi-person authentication and validation system. The VDIF file format may include or embed the policy of the image file.

The multi-person authentication and validation system can be capable of authentication and validation. The system can authenticate the identities of one or more users. The system can validate whether one or more actions are allowed on an image file, such as by validating one or more rules and/or conditions in the policy. The policy may comprise one or more conditions and/or rules. A condition and/or rule may require authentication, authorization and/or confirmation from an identified individual. In some instances, the policy may require that each identified individual provide authentication of the individual's identity (e.g., biometric authentication, user credential authentication, etc.) before providing such authorization. For example, the policy may require the authorization of each and every identified individual in the image. In some instances, the policy may require only some of the identified individuals to provide authorization. In some instances, the policy may require an identified individual to authorize all actions to be performed on or with the image. In other instances, the policy may require an identified individual to authorize one or more specific actions (e.g., sharing, downloading, uploading) to be performed on or with the image. In some instances, the policy may require that an authorization be provided within a finite period of time after an authorization request is sent by the multi-person authentication and validation system. In other instances, the policy may allow authorization to be provided at any time after an authorization request was made by the multi-person authentication and validation system. In some instances, the policy may require that an identified individual confirm that the individual was correctly identified by the multi-person authentication and validation system prior to providing authorization. In some instances, the policy may require that an identified individual confirm that the individual was correctly identified by the multi-person authentication and validation system before an authorization request is sent to the individual. In some instances, the policy may allow for rescission of one or more authorizations by the identified individual. For example, rescission can be allowed for a certain finite period of time and/or at certain windows of time. In another example, rescission can be allowed at any point in time.

The multi-person authentication and validation system can be configured to transmit an authorization request to one or more identified individuals in accordance with the policy assigned to the image file. In some instances, the system can be configured to transmit a confirmation request to one or more identified individuals (e.g., such as to confirm that the individual was correctly identified by the system) in accordance with the policy. In some instances, the system can be configured to transmit an authentication request to one or more identified individuals (e.g., such as to confirm the identity of the identified individual) in accordance with the policy. The multi-person authentication and validation system can be configured to receive authorization, authentication, and/or confirmation (or lack thereof of any combination of the three) from an identified individual.

Upon receiving the instruction and/or confirmation, the system may be configured to validate whether certain conditions and/or rules in the policy have been satisfied to allow an action. If the system determines that the conditions and/or rules have been satisfied, the system may implement the rules and/or conditions of the decryption policy, such as to maintain an image file version, update an image file version, unlock one or more specific actions (e.g., sharing, editing, deleting, uploading, downloading, etc.) to be performed on or with the image file, unlock all actions to be performed on or with the image file, send notifications, and/or other functions. If the system determines that the policy has not been satisfied, the system may deny and/or restrict one or more actions that a user may wish to perform on or with the image file, and in some cases, may provide a different image file version on which the same one or more actions can be performed in accordance with the policy.

In some instances, the system may perform the functions described above and further below in real-time. Real-time can include a response time of less than 1 second, tenths of a second, hundredths of a second, or a millisecond. Real-time can include a response time less than a millisecond. All of the functions such as those described above or further below (e.g., transmitting and receiving request and/or instructions, image processing, etc.) are capable of happening in real-time.

A multi-person authentication and validation session can begin at different points in time with reference to a life of an image (and/or image file). In some embodiments, the session can begin when the image is first captured via an image capturing device (e.g., cameras, other optical sensors) and saved as an image file in a memory of the image capturing device or other electronic storage space (e.g., memory, database, etc.). In other embodiments, the session can begin when an image file of the image is uploaded or otherwise electronically shared. In other embodiments, the session can begin when a first complaint regarding the image (and/or image file) is received by the system. Alternatively or in addition, the session can begin at other points in time. Alternatively or in addition, different processes of the session, such as identification, image processing, authentication, and/or validation, can begin and terminate at different points in time. For example, identification and image processing can occur when the image is first captured via an image capturing device and saved as an image file, and authentication and/or validation can occur at a later point in time. For example, identification and image processing can occur when the image is first uploaded or otherwise electronically shared, and authentication and/or validation can occur at a later point in time. For example, identification and image processing can occur when a first complaint is received regarding the image (and/or image file), and authentication and/or validation can occur at a later point in time.

FIG. 1 shows a schematic illustration of a multi-person authentication and validation system communicating with multiple users.

The system 100 may communicate with a plurality of users. For example, users 105, 106, 107, and 108 may communicate with a multi-person authentication and validation system 100 via user devices 101, 102, 103, and 104, respectively. A user (e.g., users 105, 106, 107, and 108) can be an individual or entity that is capable of engaging with the system 100. For example, a first user 105 may communicate with the system 100 via a first user device 101, a second user 106 may communicate via a second user device 102, a third user 107 may communicate via a third user device 103, and an nth user 108 may communicate with the system 100 via an nth user device 104. The system 100 may communicate simultaneously and/or independently with a plurality of users. In some instances, the system 100 may communicate with only a certain number of users (e.g., no more than 1, 2, 3, 4, 5, 6, 7, 8, 9, 10, 20, 30, 40, 50, 100, 150, 200, 250, 300, 400, 500, 1000, 10,000, 100,000, etc.) at certain times. Each of the users may communicate with the system 100 via a network 109.

The network 109 may be configured to provide communication between various components of the network layout depicted in FIG. 1. The network 109 may comprise one or more networks that connect devices and/or components in the network layout to allow communication between the devices and/or components. For example, the network may be implemented as the Internet, a wireless network, a wired network, a local area network (LAN), a Wide Area Network (WANs), Bluetooth, Near Field Communication (NFC), or any other type of network that provides communications between one or more components of the network layout. In some embodiments, the network 109 may be implemented using cell and/or pager networks, satellite, licensed radio, or a combination of licensed and unlicensed radio. The network may be wireless, wired (e.g., Ethernet), or a combination thereof. Additionally, while the network 109 is shown in FIG. 1 as a "central" point for communications between the various components (e.g., multi-person authentication and validation system 100, social network system 110, user devices 101, 102, 103, and 104) of the network layout, the disclosed embodiments are not limited thereto. For example, one or more components of the network layout may be interconnected in a variety of ways, and may in some embodiments be directly connected to, co-located with, or remote from one another, as one of ordinary skill will appreciate.

The user devices 101, 102, 103, and 104 may each be a mobile device (e.g., smartphone, tablet, pager, personal digital assistant (PDA)), a computer (e.g., laptop computer, desktop computer, server), or a wearable device (e.g., smartwatches). A user device can also include any other media content player, for example, a set-top box, a television set, a video game system, a virtual reality system or any electronic device capable of providing or rendering data. The user device may optionally be portable. The user device may be handheld. The user device may be a network device capable of connecting to a network, such as the network 109, or other networks such as a local area network (LAN), wide area network (WAN) such as the Internet, a telecommunications network, a data network, or any other type of network.

Each user device may comprise memory storage units which may comprise non-transitory computer readable medium comprising code, logic, or instructions for performing one or more steps. A user device may also comprise one or more processors capable of executing one or more steps, for instance in accordance with the non-transitory computer readable media. The user device may comprise a display showing a graphical user interface (GUI). The user device may be capable of accepting inputs via a user interactive device. Examples of such user interactive devices may include a keyboard, button, mouse, touchscreen, touchpad, joystick, trackball, camera, microphone, motion sensor, heat sensor, inertial sensor, or any other type of user interactive device. For example, a user may input authentication, confirmation, and/or authorization instructions or refusal of such instructions to the system 100 via one or more user interactive devices. The user device may be capable of executing software or applications provided by one or more systems (e.g., social network system 110, multi-person authentication and validation system 100). One or more applications may or may not be related to authentication and sharing images (e.g., photos). The user device can be capable of sharing images.

A user device may comprise one or more sensors. For example, a user device may comprise one or more geo-location sensors that may be useful for detecting the location of the user device. For example, the geo-location sensors may use triangulation methods or global positioning systems (GPS) to aid in determining a location of the computing device. A user device may comprise an image capture device or other optical sensor (e.g., camera) and be capable of capturing an image. For example, a camera can be integrated in the user device. The camera can be an external device to the user device and communicate via wired (e.g., cable) or wireless (e.g., Bluetooth, Wi-Fi, NFC, etc.) connection. The image capture device may be useful for capturing an image of the user or any other object within the user's environment. In some instances, the user device may receive or access one or more images captured by an external device in the external device memory, user device memory, and/or a separate storage space, including a database of a server or a cloud storage space.

The user device may be, for example, one or more computing devices configured to perform one or more operations consistent with the disclosed embodiments. In some instances, the software and/or applications may allow the users 105, 106, 107, and 108 to register with the multi-person authentication and validation system 100, receive requests (e.g., via electronic mail (email)), transmit instructions (e.g., via email), authenticate the user's identity (e.g., biometric module), view images, share images, and/or access one or more social networking systems.

The multi-user authentication and validation system 100 may communicate with one or more users (e.g., users 105, 106, 107, and 108) via the network 109 to implement various processes such as identification, image processing, authentication, and/or validation. For example, the system 100 may be configured to reliably identify an individual and authenticate the identified individual. To accomplish this, the system 100 may be equipped with hardware, for example, a biometric reader, for distinguishing the identity of the authorized user from an impostor. A system comprising a biometric reader may require an enrollment step, methods and hardware for acquiring the biometric data, and means for comparing the biometric data that is acquired with the biometric data that the user enrolled with. A biometric reader used in this capacity may have thresholds for determining whether a biometric reading falls within the acceptable confidence range of the enrolled content. In some instances a biometric reader of this type may have built-in controls that prevent the biometric reader from being tampered with, should an impostor wish to use unintended means for accessing or authorizing sharing of content. In some instances, the system 100 may be programmed with (or otherwise store in memory instructions to implement) software and/or applications to authenticate a user by requesting other user credentials (e.g., passcode, password, username, etc.).

The multi-person authentication and validation system 100 may be further configured to request authorization and/or receive corresponding authorization instructions from users. For example, the system 100 can be equipped to provide a user with information about the content (e.g., image) he/she is authorizing, so that he or she can authorize the content with or without seeing the full content. A multi-person authentication and validation system may comprise one or more screens, specialized displays, or graphical user interfaces (GUIs) for rendering information so that a user can identify the relevant content. The system 100 may be further configured to process one or more images for display.

Additionally, the multi-person authentication and validation system 100 may be able to determine whether an authorization, authentication, and/or confirmation at a particular time, in response to a request by the system 100, is within a particular time window. The temporal or sentimental qualities of shared information may also be preserved in one or more databases of the system 100, for example, if authorization from a user is required within a fixed duration of time.

The system 100 may comprise one or more servers to perform some or all operations of the system 100, as described herein. A server, as the term is used herein, may refer generally to a multi-user computer that provides a service (e.g. validation, etc.) or resources (e.g. file space) over a network connection. The server may be provided or administered by an online service provider. In some cases, the server may be provided or administered by a third party entity in connection with a device provider. Any description of a server herein can apply to multiple servers or other infrastructures. For example, one or more servers can collectively or individually perform the operations of the system 100 disclosed herein. In some instances, the server may include a web server, an enterprise server, or any other type of computer server, and can be computer-programmed to accept requests (e.g., HTTP, or other protocols that can initiate data transmission) from a computing device (e.g., a user device, a public share device) and to serve the computing device with requested data. In addition, the server can be a broadcasting facility, such as free-to-air, cable, satellite, and other broadcasting facility, for distributing data. The server may also be a server in a data network (e.g., a cloud computing network, peer-to-peer configuration, etc.).

In some embodiments, the online service provider of the system 100 may administer one or more servers to provide various services to users of the system. While some disclosed embodiments may be implemented on the server, the disclosed embodiments are not so limited. For instance, in some embodiments, other devices (such as one or more user devices of the users) or systems (such as one or more social networking systems) may be configured to perform one or more of the processes and functionalities consistent with the disclosed embodiments, including embodiments described with respect to the server and the multi-person authentication and validation system. A user (e.g., user 105, 106, 107, or 108) may be registered to the system 100, such as via creating an online account with a server of the system 100. In some instances, only registered users may be provided with one or more services of the multi-person authentication and validation system 100. In other instances, any user, registered or not, may be provided with one or more services of the multi-person authentication and validation system 100.

In some instances, the multi-person authentication system 100 can be used in conjunction with a social networking system 110. The social networking system 110 can communicate with the multi-person authentication and validation system 100 via the network 109. The social networking system 110 can communicate with one or more user devices (e.g., user devices 101, 102, 103, and 104) via the network 109 or another network. In some instances, a user (e.g., user 105, 106, 107, or 108) may be registered to the social networking system 110. In some instances, a user may be registered to both the multi-person authentication and validation system 100 and the social networking system 110. In such cases, the user may authorize the multi-person authentication and validation system 100 and the social networking system 110 to share user information (e.g., user account information, user account history, etc.) such as a user's biometric data or a user's social networking contact list.

A social network can be a social structure comprising at least one set of social entities (such as, e.g., individuals or organizations). The social network may have a set of dyadic ties or connections (or links) between these entities. Such ties or connections may be complex (e.g., first degree connections, second degree connections, third degree connections, one-to-one relationships, one-to-many relationships, many-to-one relationships, etc.). A social network can include various networks in which a user interacts with other users, such as a social group network, education network, and/or work network. A social network of a user can be characterized by, for example, a contacts list (e.g., address book, email contacts list) or a social media network (e.g., Facebook® friends list, Google+® friends list, LinkedIn® contacts, Twitter® Following list) of the user. The social networking system 110 may comprise one or more processors and a memory communicatively coupled to the one or more processors to characterize one or more social networks between users. For example, for each user of the social networking system, the social networking system may store the user's contacts list and the user's social media network. A user that is a member of a social networking system may have a unique profile with the social networking system. The social networking system may further store and/or track the user's activities on the social networking system.

The social networking system 110 may host on its server, or via an independent server, various services for its users, such as communication services (e.g., email, instant messaging, chat, comments, messages, etc.), sharing services (e.g., file sharing, document sharing, photo sharing, image sharing, video sharing, etc.), social network feed services, locational services, live (e.g., real-time) video services, and/or other services. In some instances, the social networking system may allow a user to share a photo with one or more other users via the social networking system, such as by sending the photo file to the one or more other users via various communication services (e.g., email, instant messaging, chat, etc.) or uploading the photo file to a forum that is accessible by the one or more other users. For example, a first user may upload (or post) the photo to a forum in the social networking system that is accessible and/or viewable by one or more other users. In some instances, the forum can be controlled or manipulated only by the first user. In some instances, the forum can be controlled or manipulated only by the first user and other users to whom the first user has granted permission. In some instances, the forum can be controlled or manipulated by any registered user of the social networking system. In some instances, the forum can be controlled or manipulated by any member of the public with access to the social networking system. In some instances, the first user may limit access of the forum to certain users (e.g., the second user, select group of users, contact list of the user, social network of the user, first degree connections of a social network of the user, first and second degree connections of a social network of the user, etc.). In some instances, the first user may limit access of particular content (e.g., the photo) on the forum to certain users. In some instances, the forum can be accessible by only the first user's contacts (e.g., friends, followers, following, etc.) in the social networking system. In some instances, the forum can be accessible by all users of the social networking system. In some instances, the forum can be accessible by all users who may or may not be registered to the social networking system. The first user may have flexible control over the content that is uploaded to the forum, such as the actions of uploading, sharing, downloading, editing, deleting, and/or adding context (e.g., tagging, text, metadata, etc.). In some instances, the social networking system may further store and/or track content that the user uploads using the social networking system, such as photos.

Alternatively, the multi-person authentication and validation system 100 can be used in conjunction with any other system and/or server (e.g., hosting a site, website, forum, blog, etc.) through which a user can upload and/or share information, such as an image, such as via sending an image file via a communication method (e.g., instant messaging, chatting, email, etc.) or via uploading to a forum accessible by at least one other user.

Controls mediated by a multi-person authentication and validation system may preserve or acknowledge the state of mind or agreement of multiple users regarding the use of or other actions concerning an image. For example, in some instances multi-person validation may be used to maintain, retain, share, edit, delete, upload, download or otherwise modify or use an image or image file. In some embodiments, an individual may use a multi-person authentication and validation system to retain shared control over an image or image file with other users. For example, one or more specific actions can be performed on an image or image file only upon validating collective agreement and/or collective authorization from multiple individuals. In other non-limiting embodiments, an individual may maintain individual control over at least a part of an image or image file that relates to an image of the individual. For example, an individual whose image has been identified in an image file may control actions such as modification, sharing, deletion, reproduction, uploading, downloading, or any other means of accessing or utilizing the image file. In some instances, at least a part of an image file may be protected, redacted, preserved, released, and/or otherwise utilized, in accordance with authorization provided by the individual. Original images or image files may be inserted with personal identity control keys and/or stored by the system and protected from certain actions. In some instances, the original images or image files may be processed to obscure or otherwise modify elements of the image or image file, and the processed image or image file may be released in place of the original image or image file (or unmodified copy of such image or image file) for certain actions to be performed (e.g., sharing, uploading, downloading, etc.).

Electronic multi-person validation may be integrated into a multi-person authentication and validation system for storing information (e.g., original image or unmodified copy of image) that can only be accessed through validation by the authorization of two or more individuals, for example, identified individuals. A user may enroll in or register with the multi-person authentication and validation system. In some instances, a multi-person authentication and validation system may comprise a portal for user registration and enrollment. Enrollment or registration may comprise applications or interfaces for accepting, recording, and processing user information. Examples of information a user may provide may include, name, date, address, billing information, contact information for friends or associates, social networking information (e.g., social network, contact list in social network, etc.), biometric data, and other data (e.g., photos, images).

Figure 2:
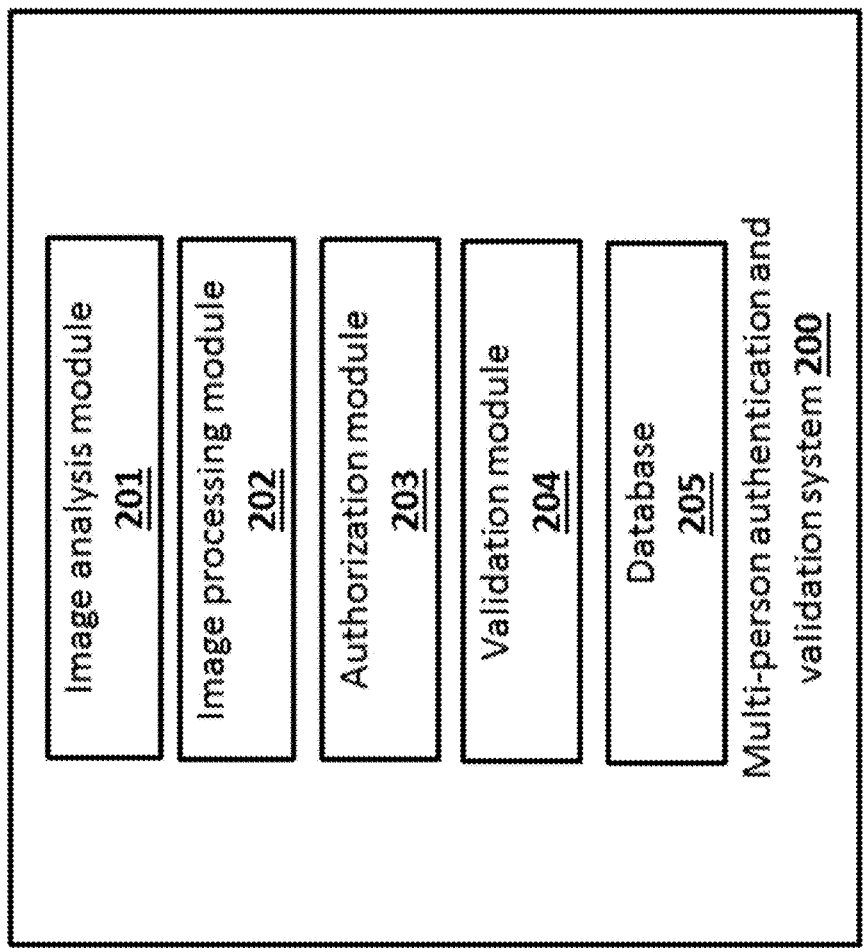
FIG. 2 illustrates components of a multi-person authentication and validation system.

FIG. 2 illustrates components of a multi-person authentication and validation system 200. The multi-person authentication and validation system 200 can comprise an image analysis module 201, image processing module 202, authorization module 203, validation module 204, and database 205.

These components of the multi-person authentication and validation system 200 are generally functional components that can generate useful data or other output using specific input(s). The components can be implemented as general or specific-purpose hardware, software, firmware (or any combination thereof) components. A component may or may not be self-contained. Depending upon implementation-specific or other considerations, the components may be centralized or distributed functionally or physically. Although a particular number of components are shown in FIG. 2, the multi-person authentication and validation system 200 can include more components or can combine the components into fewer components (such as a single component), as may be desirable for a particular implementation. One or more of the components can also be implemented by a user device. The interactions among these components are illustrated in detail below.

By way of example, with reference to FIG. 2, a first user may be a user of the system 200. The first user may be registered with the system 200. Alternatively, the first user may not be registered with the system 200 but still have access to one or more services provided by the system 200. The first user may wish to perform an action on a first image (e.g., image 300 in FIG. 3). The first image may capture an image of each of the first user, a second user, a third user, and a fourth user. The action can be a sharing action, such as sending the first image to another user via electronic communication means (e.g., email, instant messaging, chatting, etc.) or uploading the first image to a forum that is accessible by at least one other user that is not the first user. For example, the forum can be a forum of a social networking system that the first user is a member of. Alternatively or in addition, the action can be a downloading, modifying, reproducing, deleting, or other action that can be performed on the first image.

The first user's action, or attempt to perform the action, can initiate a multi-person authentication and validation session (hereinafter, "session"). In some instances, the system may automatically initiate the session as a prerequisite to performing the action. In some instances, the first user may volunteer to (e.g., intentionally) initiate the session, such as by providing the multi-person authentication and validation system 200 with the first image before performing the action. In some instances, the first user may volunteer to initiate the session by attempting the action through the system 200. For example, the system may comprise a user interface (e.g., web-based interface, application-based interface, etc.) that allows a user to perform the desired action (e.g., sharing, uploading, downloading, modifying, reproducing, deleting, etc.). Before allowing the action, the system 200 may automatically initiate the session. In some instances, the first user may attempt to perform the action through a third party user interface (e.g., user interface of a social networking system), wherein the third party host has integrated the multi-person authentication and validation services of the system 200 (e.g., API integration, etc.) to automatically initiate the session before allowing the action. In some instances, initiation of the session may stall the action from being performed on the first image. In some instances, initiation of the session may initially allow the action to be performed on the first image, and depending on the results of the session, may cancel, maintain or otherwise modify the action that has been performed.

As described above, the session can be initiated when an image file of the image is uploaded, otherwise electronically shared, or an action is performed on the image or image file. Alternatively or in addition, the session can be initiated at different points in time with reference to the life of an image (and/or image file). In some instances, the session can be initiated when the image is first captured via an image capturing device (e.g., cameras, other optical sensors) and saved as an image file in a memory of the image capturing device or other electronic storage space (e.g., memory, database, etc.). For example, upon initiation of the session, as described further below, an image file of the image can be stored and/or converted as a validated display image file (e.g., with a policy file associated with the image file). Beneficially, the only existing electronic copy of the image (e.g., image file) can be the validated display image file (VDIF), and sharing of the image may be controlled at all future points in time via the VDIF. For example, the image capturing device may comprise one or more processors and memory programmed to implement the systems and methods disclosed herein, and be capable of storing any or selected images captured by the image capturing device to be stored as a VDIF format. In another example, one or more processors communicatively coupled to an electronic storage space receiving image data from the image capturing device can be configured to implement the systems and methods disclosed herein. When the image is taken, the session can be automatically initiated (e.g., through a predetermined setting in an image capturing device and/or an electronic storage space) or selectively initiated (e.g., manual setting by a user before capturing the image) by the user.

In other instances, the session can be initiated or triggered when a first complaint regarding the image (and/or image file) is received by the system. A complaint can be made by one or more users captured in an image who are, for example, unsatisfied or otherwise displeased with display of the image or image file.

Alternatively or in addition, the session can begin at other points in time. Alternatively or in addition, different processes of the session, such as identification, image processing, authentication, and/or validation, described further below, can begin and terminate at different points in time. For example, identification and image processing processes of the session can occur when the image is first captured via an image capturing device and saved as an image file, and authentication and/or validation processes of the session can occur at a later point in time. In another example, identification and image processing processes of the session can occur when the image is first uploaded or otherwise electronically shared, and authentication and/or validation processes of the session can occur at a later point in time. In yet another example, identification and image processing processes of the session can occur when a first complaint is received regarding the image (and/or image file), and authentication and/or validation processes of the session can occur at a later point in time.

In some instances, initiating the session at an earlier point in time, such as when the image is first captured by the image capturing device (e.g., camera) or when an action (e.g., sharing, copying, etc.) is performed on the image, can provide greater control for sharing the image. For example, an image file can be replaced with and/or converted to a VDIF (e.g., an image file with embedded control policy) to regulate future actions on the VDIF. When the session is initiated at a later point in time, a copy (e.g., image file copy, photograph, photocopy, etc.) of the original image may have already been distributed to at least one other user via other routes, which may allow for other copies from the copy.

When the session is initiated, the image analysis module 201 may be configured to receive an image from a user (e.g., first image from first user) or image capturing device of the user. The image can be a picture, photo, snapshot, video, or other graphic representation or characterization. The image analysis module can be configured to identify distinct individuals from the graphics in an image. The image analysis module can comprise image recognition or facial recognition software which is configured to perform one or more facial recognition algorithms. The facial recognition algorithms may be machine learning algorithms, including deep learning. The image analysis module can be capable of distinguishing a face of a human from different objects (e.g., trees, rocks, dogs, dolls, etc.) in the image. The image analysis module can be capable of identifying and/or determining the respective identities of specific individuals via the facial recognition methods. For example, the image analysis module may identify that the first image contains graphics of the first user, the second user, the third user, and the fourth user.

In some instances, the image analysis module 201 can make such determinations and/or identifications based on user-specific information for the user who provided the image (e.g., information about the first user who provided the first image). For example, if the first user is registered to the system 200, the image analysis module can use information provided by the first user during or after registration. For example, the first user may have provided to the system 200 one or more pictures of the first user (e.g., profile picture, other pictures including the first user, etc.) identified as the first user (e.g., via tagging) and the system 200 may perform facial recognition methods on such pictures to become capable of recognizing the first user. The first user may have provided to the system 200 one or more pictures of different particular users (e.g., including the second user, third user, and/or fourth user) identified as those particular users in the pictures. The system 200 may perform facial recognition methods on such pictures to become capable of recognizing certain specific users (e.g., second user, third user, fourth user, etc.).

Alternatively or in addition, the image analysis module 201 can make such determinations and/or identifications based on other information stored in the system 200. For example, if the second user is registered to the system 200, the image analysis module can use information provided by the second user during or after registration. For example, the second user may have provided to the system 200 one or more pictures of the second user (e.g., profile picture, other pictures including the second user, etc.) identified as the second user (e.g., via tagging) and the system 200 may perform facial recognition methods on such pictures to become capable of recognizing the second user. The image analysis module can use such information to recognize the second user in the first image provided by the first user. The second user may have provided to the system 200 one or more pictures of different particular users (e.g., including the first user, third user, and/or fourth user) identified as those particular users in the pictures. The system 200 may perform facial recognition methods on such pictures to become capable of recognizing certain specific users (e.g., second user, third user, fourth user, etc.). In some instances, the system 200 may be capable of recognizing all registered users of the system 200. In some instances, the system 200 may be capable of recognizing at least some registered users of the system 200. In some instances, the system 200 may search at a first instance all first degree social networking connections of the first user in the system to match facial recognition data. In some instances, the system 200 may search up to all second degree social networking connections of the first user in the system to match facial recognition data. In some instances, the system 200 may search up to all third degree social networking connections of the first user in the system to match facial recognition data. For example, it may be more likely that an image provided by the first user contains graphics of individuals that have lower degree social networking connections to the first user in the system.

Alternatively or in addition, the image analysis module 201 can make such determinations and/or identifications based on information obtained from other servers or other systems, such as a social networking system. For example, the system 200 may obtain facial recognition data or information from one or more social networking systems that the first user is a member of (e.g., registered to). In some instances, the system 200 may obtain facial recognition data or information from other systems or servers that the first user is not a member of but which the system 200 has access to (e.g., system 200 has a license, subscription, or agreement to access facial recognition data). In some instances, the system 200 may prioritize information received from social networking systems that the first user is a member of or that the first user is otherwise related to or connected to because it can be more likely that an image provided by the first user contains graphics of individuals that are already part of the first user's social network and thus individuals for whom the social networking systems already have facial recognition data. In some instances, the system 200 may search at a first instance all first degree social networking connections of the first user in the social networking systems to match facial recognition data. In some instances, the system 200 may search up to all second degree social networking connections of the first user in the social networking systems to match facial recognition data. In some instances, the system 200 may search up to all third degree social networking connections of the first user in the social networking systems to match facial recognition data. For example, it may be more likely that an image provided by the first user contains graphics of individuals that have lower degree social networking connections to the first user in one or more social networking systems.

Alternatively or in addition, the image analysis module 201 can make such determinations and/or identifications based on information provided by the first user for the first image. For example, the image analysis module may request the first user to provide identification information (e.g., via tagging, labelling, etc.) for each human face detected by the image analysis module. In some instances, the image analysis module may request that the first user delineate each human face and also provide the identity of each human face. In some instances, the image analysis module may request the first user to provide identification information for only the human faces that the image analysis module failed to identify (e.g., because of lack of information to perform facial recognition). In some instances, a user interface provided by the system 200 can be a graphical user interface (GUI). The GUI may allow a user to delineate a human face (e.g., from other objects) by selecting (e.g., clicking or touching with a user interactive device such as a mouse, finger, or stylus, pinching, expanding, double-clicking, tapping, double-tapping, other user actions, etc.) a region of a facial image in the first image. For example, the user's selection of a region of a facial image may trigger the image analysis module 201 (e.g., via one or more algorithms) to recognize a facial image boundary surrounding the region selected. In some instances, the first user may provide identification information for a human face detected (e.g., by the image analysis module, by the first user, by other users, etc.) in the first image by selecting a region of the facial image, and entering in (e.g., via keyboard, touchscreen, etc.) identification information (e.g., first name, last name, phone number, email address, nickname, etc.) for the facial image. In some instances, the first user may be provided with a pre-existing list of individuals from the system 200 or from an external source (e.g., social networking system), such as from a contacts list or social networking connections list of the first user, to select from. In some instances, upon starting to enter in identification information, the system may provide auto-completion services (e.g., auto-completion of the first user's input query).

Alternatively or in addition, the image analysis module 201 can make such determinations and/or identifications based on information provided by users (e.g., second user, third user, fourth user, n$^{th}$ user, etc.) other than the first user for the first image. For example, the system 200 may initially allow a desired action (e.g., sharing action, uploading action) to be performed on the first image by the first user (e.g., uploader). Once the action has been performed, and the first image has been released (e.g., shared, uploaded, etc.) to at least one other user, other users who have access to the first image may provide identification information for one or more human faces detected by the image analysis module. For example, a second user may identify the second user's own facial image in the first image and provide such identification information to the image analysis module. In another example, a third user may identify the fourth user's facial image in the first image and provide such identification information to the image analysis module. In some instances, one or more users may correct incorrect identification information. In some instances, other users who have access to the first image may identify human faces that the image analysis module has failed to recognize as human faces.

In some instances, the image analysis module 201 may analyze and determine image properties for each individual identified in the image. For example, the image analysis module may determine a focus level of an individual (e.g., the first and third users can be in focus, the second and fourth users can be out of focus, etc.). In another example, the image analysis module may determine whether a whole of an individual (e.g., whole face, whole body, etc.) or only a part of an individual (e.g., right side of the face, upper half of the body, etc.) has been captured by the image. In another example, the image analysis module may determine an angle of the face captured in the image (e.g., facing front, facing different angle, etc.).

Any detections and/or identifications and/or determinations made by the image analysis module 201 can be stored in the database 205 of the system 200. Any detections and/or identifications and/or determinations made by the image analysis module associated with the image in an image file (e.g., VDIF) may be stored as metadata. Other modules in the system 200 may access contents of the database 205. In some instances, external systems (e.g., social networking systems) may access contents of the database 205.

Once the image analysis module 201 detects and identifies each individual and/or determines image properties for each identified individual from the graphics in an image, the image processing module 202 can be configured to process the image file of the image. The image processing module 202 can be configured to (1) assign personal identity controls to an image, (2) process the original image file to create one or more different image file versions, and/or (3) associate a policy to the image file.

The image processing module 202 can insert personal identity (PI) control keys for each individual identified in the image (e.g., identified via facial recognition) into the image file. A unique personal identity control key can be associated with the personal identity of each individual. For example, the first user can have a unique first PI control key, the second user can have a unique second PI control key, the third user can have a unique third PI control key, and the fourth user can have a unique fourth PI control key. For example, the first image can be inserted with four PI control keys, including the first, second, third, and fourth PI control keys for each of the four users identified in the first image. In some instances, the image processing module 202 may exclude the PI control key of the user who initiated the session (e.g., first user for the first image), that is, the user who wishes to perform some action on or with the image. A PI control key for an individual inserted into an image file can be created and/or issued by the image processing module 202. The PI control key can be managed locally, such as by the system 200. In some instances, the PI control key can be managed centrally, such as by communicating with an online server via a network (e.g., network 109 in FIG. 1).

In some cases, the image processing module 202 can piece an image file into two or more parts (e.g., pieced image files), and each part of the image file can be inserted with a different combination of PI control keys. In some instances, any two parts may be non-overlapping. In other instances, two or more parts may be overlapping. For example, the first image may be pieced into five parts, including a first part comprising the image of the face of the first user, a second part comprising the image of the face of the second user, a third part comprising the image of the face of the third user, a fourth part comprising the image of the face of the fourth user, and a fifth part comprising the rest of the graphics in the images (e.g., without the four faces). In this case, the first part can be inserted with the first PI control key, the second part can be inserted with the second PI control key, the third part can be inserted with the third PI control key, the fourth part can be inserted with the fourth PI control key, and the fifth part can be left without inserting any PI control key.

In some instances, the image processing module 202 may create different versions of the image (e.g., first image). Each version of the image can be processed differently. For example, the image processing module 202 can process the original image file, such as to pixelate, sharpen, blur, obstruct, resize, crop, increase or decrease resolution of the image in the image file. The image processing module 202 may perform other processing functions on the image file. The image processing module 202 may store a copy of the original image file in the database 205. The image processing module 202 may store a copy of each version of the image file it creates in the database 205. For example, a version of the image may be created which has the image of a particular identified individual (e.g., first user, second user, third user, or fourth user) selectively modified such as via pixelation, blurring, obstruction, cropping, lowering resolution, or other processing methods. In another example, a version of the image may be created which has the respective images of a different combination of identified individuals (e.g., second and fourth users only) selectively modified. In some instances, the image processing module 202 may create a different version of the image file for each combination of the different faces identified in the image, wherein in each version a different combination of the facial images are modified (e.g., obscured). For example, the module 202 may create 15 versions of the first image which has four faces identified, and store a total of 16 versions including the original image version. Similarly, the image processing module 202 may create 31 versions of an image where five faces are identified and store a total of 32 versions for the image including the original image version. For example, the module 202 may create a total of $(2^n-1)$ versions for an image where n faces have been identified, and store a total of $2^n$ versions for the image including the original image.

In some instances, the image processing module 202 may insert an image with the PI control key of an identified individual only if the image of the identified individual has certain image properties. For example, the module 202 may not insert an image with the PI control key of an individual who is out of focus in the image, or an individual whose face has been partially cropped in the image, etc. In some instances, the module 202 may only insert an image with the PI control key of an identified individual if the image of the individual has an image property over a predetermined threshold (e.g., resolution threshold, percentage of face captured by the image, etc.).

The image processing module 202 may assign each original image file with a policy. The policy can be a control policy. In some instances, the same policy may be assigned for every image processed by the system 200. In some instances, a unique policy may be assigned for each image processed by the system 200. In some instances, the same policy may be assigned for every image file associated (e.g., user is identified to be in image of image file, user submits image file, user performs action on image file, etc.) with a user. In some instances, a common policy may be shared between a group of users for a plurality of image files associated with the group of users. For example, one or more users may register as a group with the system 200. The policy may be defined in a policy file for the image that is stored in the database 205. The policy may comprise one or more conditions and/or rules. A policy for an image may require the satisfaction of specific conditions and/or rules before a specific action can be performed on the image. The policy for an image may define access and/or action permissions.

In some instances, at least some aspect of the policy in a policy file may be created or modified by user input. For example, a user may input a desired range of protection. The range of protection can be the identities of one or more individuals whose facial images are to be protected. For example, individuals whose facial images have been recognized in an image, but who are not included in the policy of the image, may be disregarded from one or more conditions and/or rules in the policy. In some instances, the range of protection can be automatically set to a default range of protection by the system 200 (e.g., first degree connections of a user, up to second degree connections of the user, up to third degree connections of the user, only second degree connections of the user, users with special status (e.g., celebrities, notoriety, etc.)). Alternatively or in addition, a user may designate specific individuals to be within the range of protection. As an example, four users going on vacation together and likely to take photos together or a subset of the four users may each designate the desired range of protection in the policy to be the four users. For example, the four users may apply this policy to all images created and/or captured during the period of the vacation.

In some instances, the policy file may comprise a default policy. In some instances, user input may override the default policy. In some instances, the policy file may comprise one or more conditions and/or rules that cannot be overridden. Alternatively, user input may override any conditions and/or rules. In some instances, certain conditions and/or rules may have priority over other conditions and/or rules, such that upon conflicts between conditions and/or rules within the same policy, certain conditions and/or rules override other conditions and/or rules.

The policy for an image file can be tied to each of the PI control keys inserted in the image file. For example, when an image file is inserted with one or more PI control keys, the policy can lock the original image file from select actions (e.g., sharing, uploading, editing, downloading, etc.) until certain conditions and/or rules are met. The policy can unlock the original image file from select actions when certain conditions and/or rules are met. In some cases, when an image file is inserted with one or more PI control keys, the policy can allow an action to be performed on a particular version of the image file when certain conditions and/or rules are met (or have not been met). For example, depending on what conditions and/or rules have been met, the policy may lock or unlock different versions of the image file for the action to be performed on (or with). The same policy can be associated with all versions of an image file. An image file with a policy associated with the image file may be referred to herein as a validated display image file (VDIF).

A condition and/or rule in a policy may require authentication, authorization and/or confirmation from one or more, or all, identified individuals whose PI control keys have been inserted into the image file. In some instances, a different set of conditions and/or rules can be attached for each type of action that can be performed on the image. For example, to share the image, the policy can require authorization from at least a majority of the identified individuals in the image, but to download the image the policy can require authorization from each and every identified individual in the image. In some instances, a different set of conditions and/or rules can be attached for each image version to be unlocked for actions to be performed on the image version. The policy may require authorization from each identified individual whose facial images are not modified in an image file version for a user to perform an action on the image file version. For example, to perform an action on an image version of the first image, which version has the facial images of only the second user and fourth user modified, the policy can require authorization from only the first and third user whose facial images are not modified.

In some cases, satisfaction of a condition and/or rule of the policy may unlock all actions on or with the image file or image file version. In some cases, satisfaction of a condition and/or rule of the policy may unlock only some actions (e.g., sharing, uploading, downloading, reproducing, editing, deleting, etc.) on or with the image file or image file version. In some cases, satisfaction of a condition and/or rule of the policy may allow certain actions to be performed on the image file or image file version for a certain finite period of time. In some cases, satisfaction of a condition and/or rule of the policy may allow certain actions to be performed on the image file or image file version for an indefinite amount of time. In some cases, satisfaction of a condition and/or rule of the policy may update an image file version with the original image file. In some cases, satisfaction of a condition and/or rule of the policy may update an image file version with another image file version.

In an example, depending on the conditions and/or rules of a policy for a first image, upon a request by the first user to perform an action (e.g., upload) on the first image, the system 200 may by default: (i) deny the action from being performed until one or more conditions and/or rules (e.g., everyone identified provides authorization) are satisfied; (ii) allow the action to be performed on the original image file and thereafter cancel or otherwise modify the action when one or more conditions and/or rules (e.g., a user denies authorization) are satisfied or not satisfied, such as by updating the original image file with a different image file version or cancelling the action (e.g., upload); or (iii) allow the action to be performed on a certain image file version, for example an image file version in which every identified face is modified, as allowed by one or more conditions and/or rules in the policy, and thereafter cancel or otherwise modify the action when one or more conditions and/or rules (e.g., a user provides authorization, all users provide authorization, etc.) are satisfied or not satisfied, such as by updating the image file version with a different image file version (e.g., image file version in which at least one facial image is not modified, etc.) or cancelling the action (e.g., upload).

The policy may further comprise security level settings. For example, the policy may associate one of four levels of desired security to an image file, including an 'open' level, a 'low' level, a 'medium' level, and a 'high' level. In some instances, a desired security level can be indicative of a nuisance level for users involved in the session. Different rules and/or conditions may be applicable to different security level settings. For example, more rules and/or conditions may be applicable at a higher security level setting than a lower security level setting. In an example, an 'open' security level setting can have no rules and/or conditions associated with the image file and allow users free control of the image file. That is, an image file having an 'open' security level can be released without restrictions. In another example, a 'low' security level may allow one or more actions (e.g., viewing, sharing) to be freely performed within a group of individuals, but require authorization and/or authentication when an action (e.g., viewing, sharing) is to be performed outside the group. In another example, a 'medium' security level may allow a group of individuals only to view an image file, but require authorization and/or authentication when another action (e.g., sharing) is to be performed or an action including viewing is to be performed outside the group. In another example, a 'high' security level may allow no action to be performed on the image unless one or more rules and/or conditions in the policy regarding authorization and/or authentication have been met. Alternatively there may be more or fewer levels, that may be intermediate to the above examples and/or more stringent or more loose than the above examples. In some instances, the policy may have a default security level setting. One or more user inputs may override the default security level setting in the policy.

The authorization module 203 may request authentication, authorization and/or confirmation from one or more identified individuals in accordance with the policy. For example, to perform an action, the policy may require the authorization of each and every identified individual in the image (e.g., first user, second user, third user, fourth user for the first image). In some instances, the policy may require only certain selected identified individuals (e.g., individuals whose images are in focus in the image) to provide authorization. In some instances, the policy may require at least a certain number or at least a certain percentage (e.g., at least 50%, at least 75%, at least 90%, etc.) of the total number of identified individuals to provide authorization. For example, the policy may require at least a majority of the total number of identified individuals to provide authorization. In accordance with the policy, the authorization module 203 may send an authorization request to each identified individual or selected identified individuals. For example, the authorization request can be made via a communications means, such as a message (e.g., SMS) or an email, sent to the identified individual. In some instances, the authorization request can be made via a phone call or voice mail. The authorization module 203 system may obtain contact information for the identified individuals from within the system 200 (e.g., in the database 205) or from an external source. The external source can be a social networking system. The external source can be the system from which the image analysis module 201 obtained facial recognition data. The contact information can include a phone number, a mail address, and/or an email address.

In some instances, the policy may require that each identified individual provide authentication of the individual's identity (e.g., biometric authentication, user credential authentication, etc.) for the authorization to have any effect. The authorization module 203 may request such authentication from the individual. For example, the authorization module 203 may send the identified individual an authentication request before sending the authorization request, in order to insure that the respondent will be the right person. Alternatively, the authorization module 203 may send the identified individual an authentication request simultaneously with the authorization request. Alternatively, the authorization module 203 may send the identified individual an authentication request after having sent the authorization request and/or having received authorization instructions.

The authentication request may allow the individual to authenticate the individual's identity via biometric authentication. In some instances, the authorization module 203 may further comprise a biometric module for authentication. A biometric module may comprise hardware and software components for collecting, storing, processing, translating or analyzing biometric data. Biometric data may include any feature or output of an organism that can be measured and used to uniquely identify the organism. Biometric data may include, but not be limited to, fingerprints, DNA, body temperature, face/hand/retina or ear features, behavioral characteristics such as typing rhythm, gait, gestures and voice. Hardware components in a biometric module may further comprise biometric readers, for example a fingerprint reader or retinal scanner, microprocessors, and RAM/ROM memory. Software components may comprise one or more software-based programs, including applications, protocols, or plugins, configured for collecting and/or processing biometric data from the hardware components of the biometric module. In some instances, collection and processing biometric data may comprise steps for analyzing the biometric data, creating a template (i.e. digital template) for biometric data, storing, matching, and verifying the biometric data (i.e. with an external database or previously stored information). In some embodiments a biometric reader may also be coupled to a user device through wired or wireless means. Wireless means may include one or more types of Wi-Fi or peer-to-peer (P2P) networking protocols. In other embodiments a biometric reader may be built into the web-enabled device. In some embodiments, the biometric module may be included, installed, or attached to the user device.

Alternatively or in addition, the authentication request may allow authentication via user credentials (e.g., password, passcode, etc.). For example, prior to authentication, a user may have provided the system 200 with such user credentials, such as during or after registration with the system 200. Alternatively, or in addition, the authentication request may allow authentication via device (e.g., one-time password device, user device, etc.) authentication. Alternatively or in addition, the authentication request may allow authentication via third party service authentication (e.g., authentication via social networking system account, authentication via verified email account, etc.). The authentication request may allow the recipient to deny that the recipient is the identified individual (e.g., when the module 203 sent the request to a wrong contact address of the identified individual). Authentication information received by the authorization module 203 can be stored in the database 205. If a recipient fails authentication, the authorization module 203 may try contacting the identified individual via a different contact address (e.g., secondary phone number, secondary email address, etc.), such as from system 200 information, an external source, or by requesting contact information from the user providing the original image (e.g., uploader, sharer, etc.).

In some instances, the authentication request may expire after a finite duration of time. For example, the authentication request sent by the authorization module 203 may expire after a certain period of time, such as in 10 minutes, 30 minutes, 1 hour, 2 hours, 3 hours, 4 hours, 5 hours, 6 hours, 7 hours, 8 hours, 9 hours, 10 hours, 11 hours, 12 hours, 15 hours, 18 hours, 21 hours, 1 day (e.g., 24 hours), 2 days, 3 days, 4 days, 5 days, 6 days, 1 week (e.g., 7 days), 2 weeks, 3 weeks, 4 weeks, 1 month, 2 months, 3 months, 4 months, 5 months, 6 months, 9 months, 12 months, 1 year, 2 years, 3 years, or other duration of time. If the recipient does not provide authentication within the certain period of time, the authorization module 203 may automatically presume a denial (or failure) of the authentication request. Alternatively, the request may not expire, and the recipient may provide authentication at any time. In some instances, if an authentication request has expired, and authentication is provided by the recipient individual after expiration, the authorization module 203 may update the presumption.

In some instances, the authorization request may contain (e.g., in an SMS message or in an email) a preview or copy of the image file. In some instances, the authorization request may contain a preview or copy of an image file version in which all facial images of other identified individuals have been modified (e.g., pixelated) except for the facial image of the identified individual to whom the present authorization request is being sent. The authorization request may give the recipient options to authorize or deny the request. The recipient individual can provide the authorization instruction in response to the authorization request via connecting to a link (e.g., hyperlink) provided by the authorization request (e.g., in an SMS message or in an email). In some instances, the recipient individual can provide the authorization instruction in response to the authorization request via a response email, response message, or auditory instructions (e.g., in response to voice mail or phone call authorization requests). The recipient individual can provide the authorization instructions via other methods that communicate the instructions to the authorization module 203. Authorization instructions received by the authorization module 203 can be stored in the database 205.

In some instances, the policy may require an identified individual to authorize all actions to be performed on or with the image file. In other instances, the policy may require an identified individual to authorize one or more specific actions (e.g., sharing, downloading, uploading) to be performed on or with the image file. For example, the authentication request sent by the authorization module 203 may contain one or more action options that the recipient may choose to authorize or deny.

In some instances, the policy may require that an authorization instruction be provided within a finite period of time after an authorization request is sent by the authorization module 203. In other instances, the decryption policy may allow authorization to be provided at any time after an authorization request was made by the authorization module 203. For example, the authorization request sent by the authorization module 203 may expire after a certain period of time, such as in 10 minutes, 30 minutes, 1 hour, 2 hours, 3 hours, 4 hours, 5 hours, 6 hours, 7 hours, 8 hours, 9 hours, 10 hours, 11 hours, 12 hours, 15 hours, 18 hours, 21 hours, 1 day (e.g., 24 hours), 2 days, 3 days, 4 days, 5 days, 6 days, 1 week (e.g., 7 days), 2 weeks, 3 weeks, 4 weeks, 1 month, 2 months, 3 months, 4 months, 5 months, 6 months, 9 months, 12 months, 1 year, 2 years, 3 years, or other duration of time. If the recipient does not provide an authorization instruction (e.g., "authorize," "deny", [action] to authorize or deny, etc., etc.) within the certain period of time, the authorization module 203 may automatically presume a denial of the request. Alternatively, the request may not expire, and the recipient may provide an authorization instruction at any time. In some instances, if an authorization request has expired, and an authorization instruction is provided by the recipient individual after expiration, the authorization module 203 may update the presumption to the recipient's instructions. Alternatively, if the recipient does not provide an authorization instruction within the certain period of time, the authorization module may automatically presume an authorization of the request. In such cases, if an authorization denial instruction is provided by the recipient individual after expiration, the authorization module may update the presumption to the recipient's instructions.

In some instances, the policy may require that an identified individual confirm that the individual was correctly identified by the image analysis module 201. For example, it may be meaningless to obtain authorization and/or authentication from an incorrectly identified individual. The authorization module 203 may send the identified individual a confirmation request prior to sending the authorization request and/or the authentication request. The confirmation request may contain (e.g., in an SMS message or in an email) a preview or copy of the image file. In some instances, the confirmation request may contain a preview or copy of an image file version in which all facial images of other identified individuals have been modified (e.g., pixelated)

except for the facial image of the identified individual to which the present confirmation request is being sent. The confirmation request may allow the recipient to confirm or deny the identification in the image file or image file version. The authorization module 203 can receive such confirmation instructions and store in the database 205.

In some instances, the policy may allow for rescission of one or more authorizations or confirmations by the identified individual. For example, rescission can be allowed for a certain finite period of time and/or at certain windows of time. In another example, rescission can be allowed at any point in time. The policy may comprise conditions and/or rules to implement in the event of a rescission. For example, the authorization request provided by the authorization module 203 may contain an option to rescind authorization. In some instances, after authorization instructions are provided, the module 203 may separately send the recipient instructions for rescission, such as via email or SMS message. The instructions for rescission may instruct the recipient on how to rescind the authorization should the recipient wish to. The instructions may comprise a link (e.g., hyperlink) that the individual can click. In some instances, the policy may require (a second) authentication before an authorization can be rescinded. In another example, the confirmation request provided by the authorization module 203 may contain an option to rescind confirmation. In some instances, after confirmation instructions are provided, the module 203 may separately send the recipient instructions for rescission of confirmation, such as via email or SMS message. The instructions for rescission may instruct the recipient on how to rescind the confirmation should the recipient wish to. The instructions may comprise a link (e.g., hyperlink) that the individual can click. In some instances, the policy may require authentication before a confirmation can be rescinded.

As can be appreciated, each of the authorization, authentication, and/or confirmation requests can be sent in different orders than described herein. In some instances, each of the authorization, authentication, and/or confirmation requests can be communicated to a recipient via a pre-established communication channel.

Upon receiving authorization instructions, authentication, and/or confirmation instructions, the validation module 204 may validate whether or which rules and/or conditions of the policy have been satisfied. For example, depending on the rules and conditions in the policy and the authorization instructions (or lack thereof) received, the validation module 204 may validate that a specific action can be performed. Depending on the rules and conditions in the policy and the authorization instructions (or lack thereof) received, the validation module 204 may validate that an action can be performed on a specific image file version. The validation module 204 may access the database 205 to access the rules and/or conditions of the policy for the image file. The validation module 204 may access the database 205 to access one or more authorization instructions, authentication requests, confirmation instructions, and/or rescission instructions.

The validation module 204 may thereby, in accordance with the policy, proceed with (1) allowing or denying an action (e.g., sharing, uploading, downloading, modifying, deleting, etc.) requested by a user providing the image file to be performed on the image file, and/or (2) allowing or denying an action (e.g., sharing, uploading, downloading, modifying, deleting, etc.) requested by the user providing the image file to be performed only on certain image file versions.

In some instances, the provision of an instruction or authentication for an image file can trigger the validation module 204 to check for validation in the policy of the image file.

In some instances, the system 200 and its components may perform the functions described above and further below in real-time. Real-time can include a response time of less than 1 second, tenths of a second, hundredths of a second, or a millisecond. Real-time can include a response time less than a millisecond. All of the functions (e.g., transmitting and receiving requests and/or instructions, authentication, validation, image processing, etc.), such as those described above or further below, are capable of happening in real-time.

While FIG. 2 shows one database 205 for the system 200, there can be a plurality of databases, for example a database for storing original image files, a database for storing image file policies, a database for storing processed image file versions, a database for storing image properties, a database for storing identification information for images, a database for storing authorization instructions, a database for storing authentication information (e.g., status), a database for storing confirmation instructions, a database for storing user information (e.g., for registered users), a database for storing facial recognition data or information, a database for storing transitional data, a database for storing metadata, and/or other databases. One or more databases individually or collectively may share any combination of information or data. The system 200 may comprise multiple or duplicate databases for storing data or information as described herein.

While distinct modules in FIG. 2 have been described to perform or implement distinct functions, a module (e.g., image analysis module 201, image processing module 202, authorization module 203, validation module 204, etc.) of the system 200 is not limited to perform or implement as such. In some instances, a first module can be a sub-module of a second module. A parent module may be capable of implementing or performing any and all functions of a sub-module (e.g., child module). For example, the authorization module 203 can be a sub-module of the validation module 204, and the validation module 204 can selectively perform any and all functions of the authorization module 203. Different modules described herein can, individually or collectively, perform the different functions described herein. For example, the image analysis module 201 may perform some image processing functions of the image processing module 202. In some instances, the authorization module 203 can perform additional identification functions, such as during authentication or confirmation processes (e.g., to update incorrect identification by the image analysis module 201).

During or at the end of the multi-person authentication and validation session, the system 200 may therefore output an action performed on the image and/or output one or more image file versions. In some instances, as part of performing the action, the system 200 may present an image on a display, such as in a graphic user interface on the display. The display can be a display operatively coupled to, or otherwise integrated in, the multi-person authentication and validation system 200. The display can be a display operatively coupled to, or otherwise integrated in, the user device (e.g., user devices 101, 102, 103, 104 in FIG. 1, etc.) of a user (e.g., users 105, 106, 107, 108 in FIG. 1).

Figure 3:
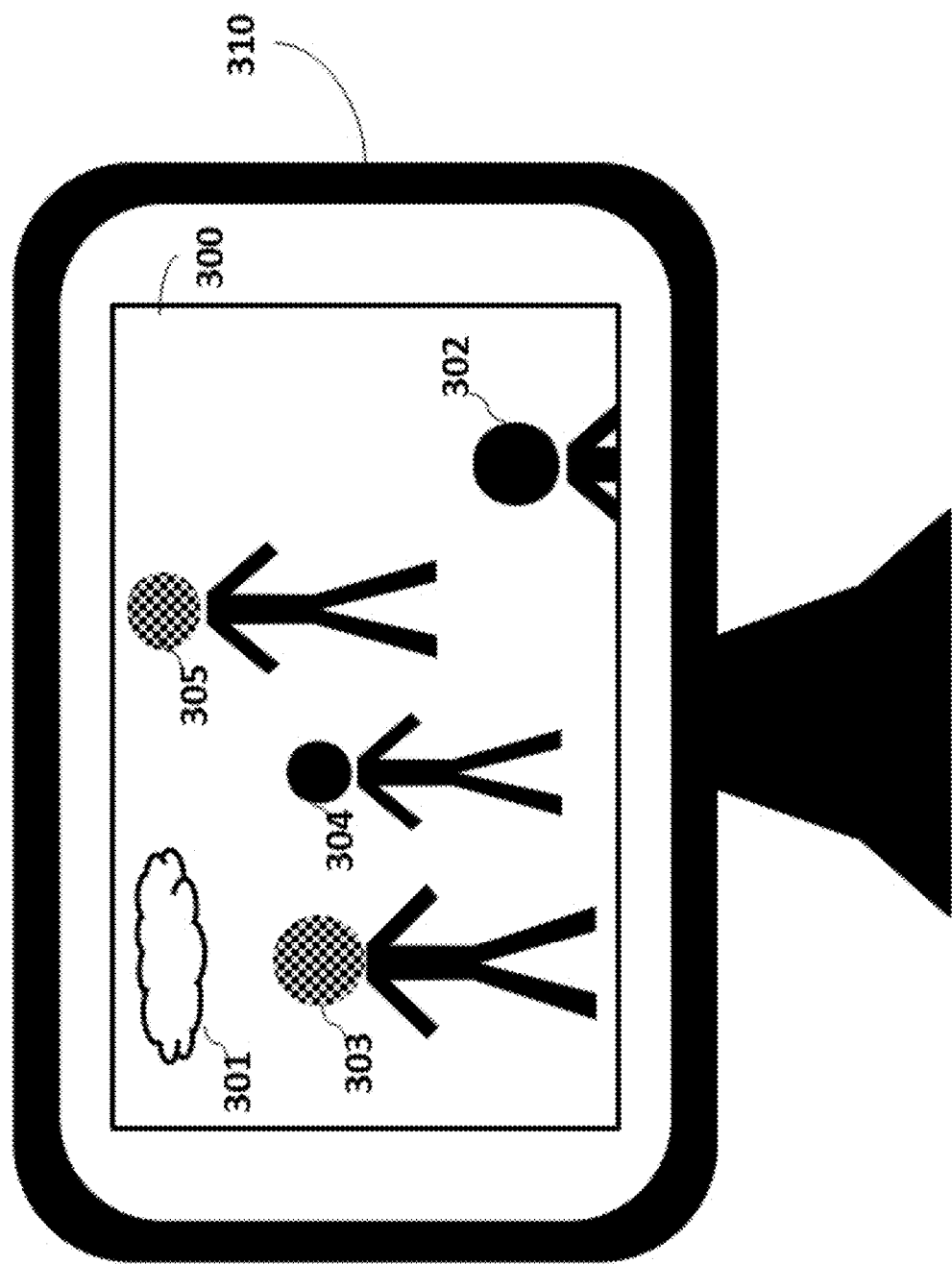
FIG. 3 shows a processed image file version presented on a display, in accordance with some embodiments described herein.

FIG. 3 shows an exemplary processed image 300 presented on a display 310, in accordance with some embodiments described herein. A multi-person authentication and validation system may comprise presentation services. The presentation services may provide a personal interface for user interaction with the system. In some instances, the presentation services may be accessed through a web portal and/or through a web-based application. In some instances, the user device used for accessing the web portal or for engaging a web-based application may require a network with a TCP (Internet) protocol. In some instances content may be rendered through Hyper Text Markup Language (HTML) and objects accessed directly through a browser. In other instances, the presentation services may be delivered through SaaS (Software as a Service) or cloud-enabled devices or application(s), for example using one or more application(s) that run on a SaaS, or cloud-enabled device. The presentation services may further comprise graphical user interfaces or other interfaces that make it easier for users to access content. The user device may comprise a display 310 to access the graphical user interfaces of the presentation services. In some instances, the multi-person authentication and validation system can comprise the display 310. In some instances, an external system (e.g., social networking system) which communicates with the multi-person authentication and validation system can comprise the display 310.

Referring to FIG. 3, a processed image 300 is presented on the display 310. The processed image 300 can be recalled from an image file version created by the image processing module 202 (in FIG. 2) and stored in the database 205 (in FIG. 2). By way of example, the processed image 300 can be an image file version of an original image file for which four individuals have been identified in the original image, a first user 302, a second user 303, a third user 304, and a fourth user 305. The first user 302 may have provided the original image to the system. The multi-person authentication and validation system may have distinguished each of the four faces from other non-facial objects in the original image, such as an oval cloud 301 captured in the image. The system may have identified each of the faces to specific individuals, such as from information within the system and/or from information external to the system (e.g., social networking system). The information can have been specific to the first user 302 or the information can have been non-specific to any user. In one embodiment, each user identified by the system can be registered users of the system. In other embodiments, a user identified by the system may or may not be a registered user of the system.

After the individuals have been identified, the system can process the original image to create different image versions, such as the processed image 300. The system can process the original image to modify a certain combination of facial images in the image. In some instances, the system can create a new image file version for each combination of facial images that can be modified. For example, for an original image that has four faces identified, there can be a total of at least 16 versions, including the original image version. The processed image 300 can be one of the 16 versions. For example, in the processed image 300, the respective faces of the second user 303 and the fourth user 305 have been modified via selective pixelation.

After the individuals have been identified, the system can process the original image to insert PI control keys for each individual identified. The system can assign a policy (e.g., control policy) for the image. The policy may comprise one or more rules and/or conditions. The policy may require the satisfaction of one or more rules and/or conditions before an action on the image or an image version is allowed. The policy may allow an action on the image or an image version unless or until the satisfaction of one or more rules and/or conditions. The policy may allow an action to be performed on a specific image file version depending on whether or which of the one or more rules and/or conditions have been satisfied.

For example, the first user may request to perform an uploading action of the original image. For an uploading action on the original image, a first rule in the policy for the image may require authorization from each identified individual. The system may send authorization requests, confirmation requests, and/or authentication requests to each of the identified individuals. In some instances, a user may provide authorization instructions by clicking on an area of the image representative of the user's facial image through a graphical user interface of the system. For example, the authorization request can comprise a preview or a copy of the image file, as described elsewhere herein.

For example, in response to the authorization requests by the system, the first user 302 and the third user 304 may each provide authorization instructions while the second user 303 and the fourth user 305 each deny the authorization request and/or let an expiration time for the authorization request lapse. The system may validate whether one or more rules and/or conditions have been satisfied in accordance with each of the authorization instructions received or not received. After validation, because the first rule in the policy has not been satisfied, the system may deny the first user the desired uploading action for the original image. The first user may not upload the original image.

A second rule in the policy for the original image file may provide that an uploading action can be instead performed on an image file version in which the facial images of each individual denying authorization are modified (e.g., via pixelation). Because the processed image 300 modifies the facial images of the second user 303 and the fourth user 305 who failed to provide authorization, in accordance with the second rule in the policy, the system may allow the first user to upload the processed image 300. The image file version for the processed image 300 can be uploaded and the processed image 300 can thereby be presented on the display 310. In some instances, the third user 304 who previously provided authorization may rescind the authorization at a later time. The rescission can prompt the system to re-validate whether one or more rules and/or conditions have been satisfied after the rescission. Because the processed image 300 does not modify the facial image of the third user 304, according to the second rule in the policy, the system may cancel the uploading of the image file version of the processed image 300. In some instances, the system may replace the image file version of the processed image 300 with the image file version of another processed image that modifies the respective facial images of the second user 303, the third user 304, and the fourth user 305, which would satisfy the rule in the policy. For example, a third rule in the policy may direct the system to perform the first user's desired action on the image file version that satisfies the two previous rules with the least degree of modification relative to the original file version.

Figure 4:
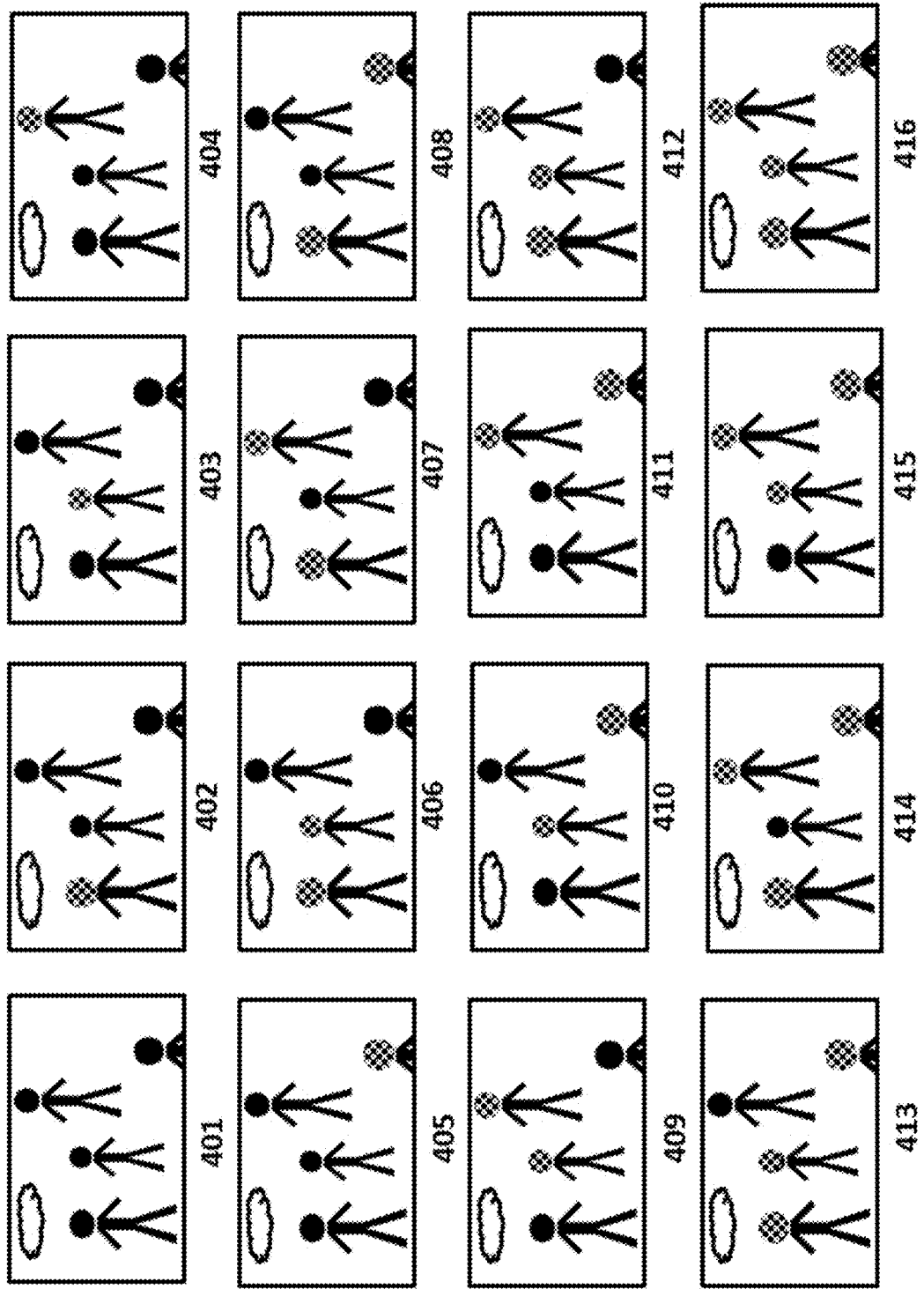
FIG. 4 shows a plurality of processed images of different image file versions.

FIG. 4 shows a plurality of processed images of different image file versions. For an image for which the system has identified one or more faces of distinct individuals, the system can create a new image file version for each combination of facial images that can be processed to be modified. For example, as described elsewhere herein, for an original image that has four faces identified, the system may create a total of 15 image file versions of the original image version for a total of 16 image file versions, including the original image file. Each of processed images 401-416 can represent a different image version of the 16 image versions. For example, image 401 is from an original image file version, image 416 is from an image file version in which each and every facial image in the original image has been modified via pixelation, and image 412 is from an image file version in which a certain three of the four facial images of the identified individuals have been modified.

In some instances, a first rule and/or a first condition in a policy for the image file can provide that any action on the image file is presumed authorized by each user unless specifically denied. For example, in accordance with the first rule in the policy, upon a first user attempting an uploading action on the original image, the system may initially allow the uploading action and upload the original image (e.g., image 401). The system may then alert the identified individuals of the uploading action. Alternatively, in some instances, an identified individual may discover the uploaded image without notification from the system. The system may allow an identified individual to deny (the presumed) authorization. If one or more identified individuals deny authorization, the system may cancel the uploading action and remove the uploaded image. In some instances, the system may replace the uploaded original image with another image version (e.g., one of image versions 402-416), in accordance with one or more other rules in the policy for the image file.

In some instances, a first rule and/or first condition in a policy for the image file can provide that any action on the image file is presumed denied by each identified individual unless specifically authorized. A second rule in the policy for the original image file may provide that any action can be instead performed on an image file version in which the facial images of each individual denying authorization are modified (e.g., via pixelation). For example, in accordance with the first rule and the second rule in the policy, upon a first user attempting an uploading action on the original image, the system may initially allow the uploading action of an image version in which the respective facial images of each and every identified individual are modified (e.g., image 416). The system may then alert the identified individuals of the uploading action. Alternatively, in some instances, an identified individual may discover the uploaded image without notification from the system. The system may allow an identified individual to provide authorization over the (presumed) denial. If one or more identified individuals provide authorization, the system may replace the uploaded processed image version with another processed image version (e.g., one of image versions 401-415), in accordance with the first and second rules and/or one or more other rules in the policy for the image file.

In some instances, a user may provide authorization at any time. In some instances, a user may provide a denial of authorization at any time. In some instances, a user may rescind an authorization initially provided at any time. In some instances, a user may rescind a rescission at any time. The system may allow, cancel or adjust an action each time an instruction (e.g., authorization, denial, rescission, etc.) is provided by a user, such as by allowing an action on an original image file or an image version, updating image versions, and/or cancelling an action (e.g., taking down an upload, etc.), in accordance with one or more rules and/or conditions in the policy for the image file.

Figure 5:
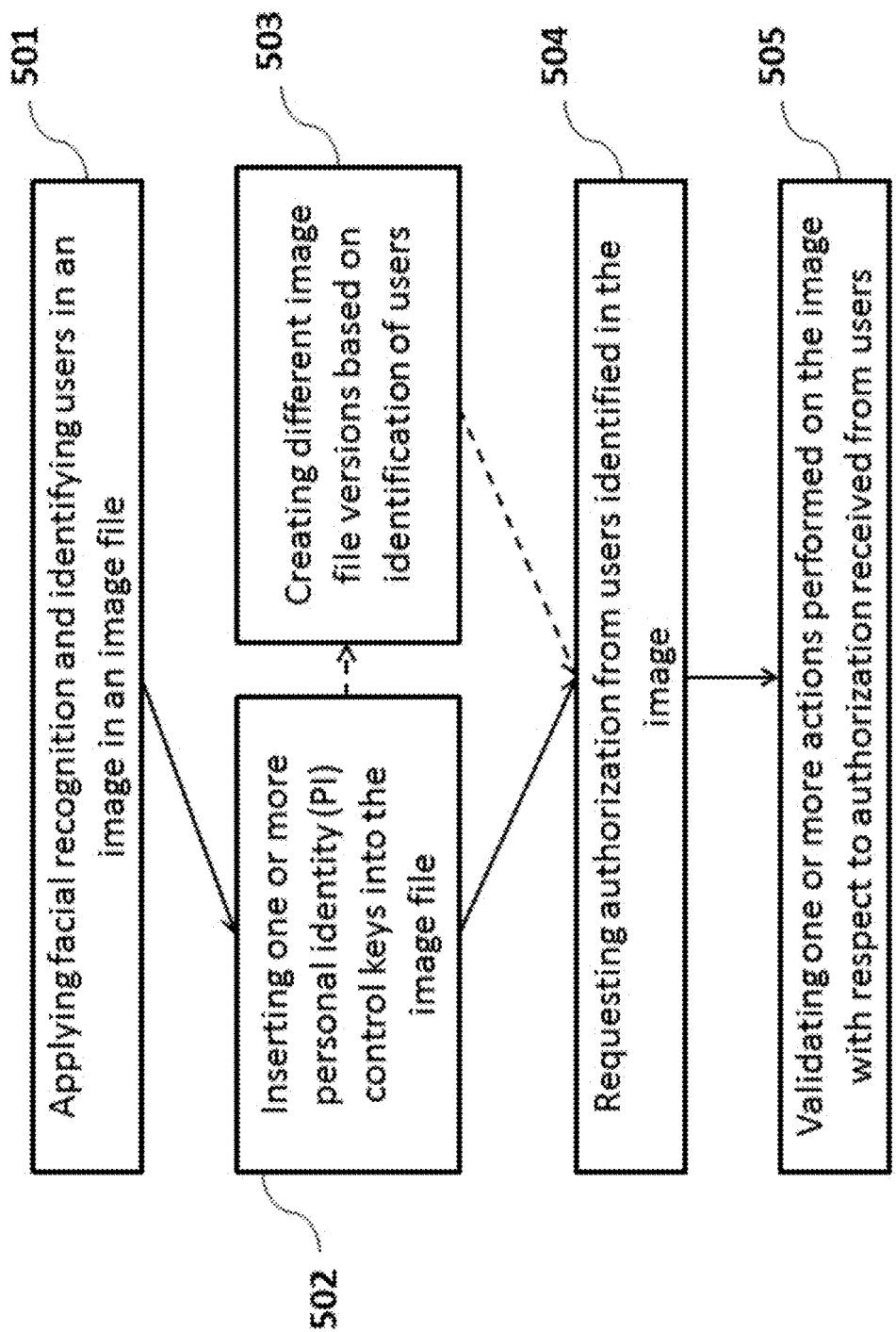
FIG. 5 illustrates steps for multi-person authentication and validation, according to some embodiments described herein.

FIG. 5 illustrates steps for multi-person authentication and validation, according to some embodiments described herein. A multi-person authentication and validation session can be initiated when a first user attempts to perform an action or requests to perform the action on an image file. Upon initiation of the session, the image file can be received by the multi-person authentication and validation system. At a first operation 501, the system can detect human faces in the image, such as by performing facial recognition methods to distinguish human faces from other objects in the image. The system can then assign the identity of each face to a distinct individual. The system may base the identification at least in part on information stored within the system, such as in a database of the system and/or information stored in a location external to the system, such as in a social networking system.

At a second operation 502, the system can insert a personal identity (PI) control key into the image file for each identified individual. For example, if four users are identified, the PI control keys for each of the four users can be inserted into the image file. The PI control key can be unique to each user. The system can assign a policy (e.g., control policy) to the image file. The policy may be tied to the PI control keys inserted into the image file. The policy may comprise one or more rules and/or conditions. The one or more rules and/or conditions in the policy may require one or more of authorization, authentication, and/or confirmation from identified individuals whose PI control keys have been inserted in the image file in order for one or more actions to be performed on the image file. In some instances, an individual whose PI control key has been inserted in the image file may maintain shared or individual control over at least part of the image file.

In some instances, in the next operation 503, the system may create different image file versions of the original image file based at least in part on the identification of individuals. For an image for which the system has identified one or more faces of distinct individuals, the system can create a new image file version for each combination of facial images that can be processed to be modified. For example, the system may selectively modify the respective facial images of one or more identified individuals by processing methods such as pixelation, decreasing or increasing of resolution, sharpening, blurring, obstructing, resizing, cropping, other processing methods, and/or a combination thereof. For example, as described elsewhere herein, for an original image that has four faces identified, the system may create a total of 15 modified image file versions to obtain a total of 16 image file versions, including the original image file. The image file versions can each be stored in memory of the system, such as in a database of the system.

In the next operation 504, the system may request authorization, authentication, and/or confirmation in accordance with the policy assigned to the image file. For example, the authorization, authentication, and/or confirmation requests can be sent to the identified individuals whose PI keys have been inserted into the image file. The system may receive such authorization, authentication, and/or confirmation instructions (or lack thereof).

In the next operation 505, based on such authorization, authentication, and/or confirmation instructions (or lack thereof) received by the system, the system may validate whether one or more rules and/or conditions of the policy for the image file have been satisfied. In some instances, receipt of an authorization instruction, authentication instruction, confirmation instruction, and/or a denial thereof can trigger the system to validate. The system may allow or deny one or more actions to be performed on the image file in accordance with the policy. In some instances, the system may allow or deny one or more actions to be performed only on a specific image file version previously created. In some instances, the system may modify or cancel an action that has already been performed on an image file or image file version, such as cancelling an upload of an image file or replacing an uploaded image file version with another image file version. An identified individual may rescind a previous instruction. An identified individual may be required to provide an instruction within a finite period of time, the lapse of which can create a presumption of denial. Alternatively a lapse of a finite period of time to provide instructions can create a presumption of authorization. Alternatively, an identified individual may provide an instruction at any point in time without time restrictions.

EXAMPLES

An example of one or more uses of the multi-user authentication and validation system is provided. A group of four friends are going to go on a trip to Las Vegas. They decide to protect their mutual privacy by enrolling as a group ("photo validation group") with the multi-user authentication and validation system. Upon enrollment as a group, the cameras on their mobile devices can be enrolled and/or registered in the photo validation group, such that all images captured during the duration of the trip (e.g., during the duration that the photo validation group exists) by the cameras will be saved in validated display image file (VDIF) format. That is, the multi-user authentication and validation system, or at least a part thereof, can be initiated upon capture of an image by any of the four friends. As part of forming the group, personal identification photos can be gathered for reference by the system (e.g., by the image analysis module 201 in FIG. 2), such as for each of the four friends in the group. The system may use such personal identification photos as reference to perform identification using one or more facial recognition algorithms.

In the example above, when the four friends first join the photo validation group, the system may send out a request for user input on group policy. The group policy can apply to all image files associated with the group, such as all image files taken by the enrolled cameras of the four friends for the duration of the trip. For example, the system may request each of the four friends to input a desired individual security level setting. A first member may select complete anonymity. The first member can agree to step away from pictures whenever possible and, if captured in a picture, to use an optional manual editor (e.g., provided by the system and/or mobile device and/or other device, etc.) to modify (e.g., pixelate or otherwise modify) their personal image in one way or another. A second member, on the other hand, may not mind being displayed in any photographs and also may not want to be involved in the hassle of authenticating and/or authorizing image files in accordance with the system. The second member may thus select a security level setting (e.g., 'open' level) that releases all personal protection controls for the second member, and therefore may not receive any privacy protection. The other two members may select security level settings that allow them to participate as validating members in the photo validation group.

Additionally, the system may request the group of friends to input a desired group security level setting for image files associated with the group. To make things simple during the trip, the members agree to select a 'low' security level within the group by default, and to encourage all members in their group to flag any questionable photos (e.g., images) for high security treatment at the time when a photo is being taken or when a photo is later reviewed. A 'low' group security level setting can allow image files associated within the group to be fully viewable within the group, but not sharable, printable, or uploadable outside the group without authorization and/or authentication from the validating members. Members are expected not to share any photos with people outside the group or e-mail them. At any point, the individual or group security level setting can be raised, and further restrictions can apply per one or more rules and/or conditions in the policy.

The members may also agree that anyone in the group can designate any photo or photos for timely validation by inputting a validation expiration time in the group policy. For example, upon validation request (for requesting release) of a photo, the photo can be circulated to all validating members who appear in the photo, and members who do not respond by 10:00 am the following morning can be presumed to have released their privacy interest (e.g., authorized sharing of the photo). Validating members can then decide whether to release their personal protection rights and authorize sharing of the photo, prevent sharing of the photo, and/or to modify their personal image before sharing the photo, such as by selective greying out or pixelation of their personal image, in accordance with the policy of the photo.

Optionally, the validating members can also agree to accept verbal instructions in one another's presence. Whenever one person is using an electronic device, that person can take on the role of group secretary and act on behalf of other group members who are also present to input information (e.g., user input for policy) for them.

During the trip, hundreds of pictures can be taken using their enrolled cameras, and all pictures can be saved as validated display image files (VDIFs). As they are saved, the image analysis module in the system can detect whose pictures are recognizable in each image. As time goes on, photographers or others in the group can check these identifications for accuracy and, when necessary, correct the identifications by manually inputting identification information and/or inserting new identifications unidentified by the system. Manual corrections and/or new insertions of identification information can perfect the treatment of individual images and also help the image analysis module to improve the accuracy of automatic facial recognition on subsequent photos. For example, the image analysis module may be able to identify clothing worn consistently by a certain individual in several photos and identify the individual in subsequent photos by recognizing that clothing. Whenever members of the group take time out to review the photos, they can have an opportunity for image review. In an image review session, for every photo that a validating member reviews and does not actively respond to, the system can presume authorization of release of the validating member's personal rights in the photo. Also, a reviewer can view an entire mosaic of photo images, select a first subset for personal release, then select a second subset for further inspection and personal release, and then a third subset for personal image modification, which, if desired, the reviewer can modify on the spot. On the other hand, the reviewer can have the opportunity at any point to promote an image file to a higher level of security and/or demand that her/his appearance in that image be modified before any subsequent release. Alternatively or in addition, the reviewer may edit the image manually on the spot with the aid of the image analysis module.

As long as the security level setting is maintained as 'low,' the viewing of an image file on an electronic device within the group can be allowed freely. For example, any member of the group may view the image file in its unmodified version. Such display may be restricted as the security level setting is promoted to 'medium' or 'high.'

Each validated display image file can identify the photographer or source of the image. In some instances, at higher levels of security level settings, modified image versions can be displayed. For example, the modified image versions can present the image at lower resolutions (either as a result of displaying an image of small size or displaying an image of usual size but with multi-pixel blocks of common color), grayed out, blurred, pixelated, obstructed, and/or other methods of modification. Alternatively, the modification may be configured to defeat conventional screen-capturing technology (e.g., image file can be displayed in a composite transitory view wherein a tool-tip shows small but full resolution full-color regions at the location of the cursor).

At the conclusion of the trip, everyone can get together to review the image files in which at least one validating member has not already released privacy protection for their appearance. This work can be done remotely, if need be, through the multi-person authentication and validation system, such as over a computer network. The members can mutually decide on the disposition of those image files, some of which may be marked as non-uploadable indefinitely, and others of which may be released as modified image versions. In the same session, the members can decide which images each will share and how they will share them and upload them. In some instances, the image files which are marked as non-uploadable indefinitely may be deleted from memory where the image files are stored.

Then, when the image files are uploaded—the human-containing images as validated display image files and others as simple image files—the system may screen the image files and discover and/or detect in one image file the two faces of a couple who appear in the background who are known to the system but are not members of the group. Each of the couple may have been flagged as members of the system who wish to maintain their privacy unless explicit authorization is given to the system. For example, the couple may have pre-indicated in the system that image files associated with their respective images have a security level setting that requires their authorization before release. The system can therefore lock that image file for the time being, and contact each member of the couple for authorization to release the photo by sending a validation request (e.g., authorization request). The couple may authorize release after pixelation of their images. The system may transmit the conditional authorization to the photo validation group. Upon approval of the photo validation group, the image can be released as an image file version with further pixelation.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:
1. A method for using multi-person authentication and validation for sharing an image, comprising:

(a) obtaining an image file of an image, wherein the respective faces of one or more individuals are captured in the image;
(b) identifying, with the aid of one or more processors executing one or more facial recognition algorithms, the one or more individuals captured in the image;
(c) inserting a personal identity control key for each of the one or more individuals identified in the image into the image file;
(d) providing a control policy for the image file, wherein the control policy comprises one or more rules associated with the personal identity control key for each of the one or more individuals identified in the image;
(e) receiving a request to perform an action on the image file;
(f) in accordance with the control policy, requesting authorization instructions from each of the one or more individuals identified in the image to perform the action on the image file;
(g) based at least in part on the authorization instructions received from at least one of the one or more individuals identified in the image, validating the satisfaction of the one or more rules in the control policy to perform the action on the image file; and
(h) based on the validation, allowing or denying the action to be performed on the image file.

2. The method of claim 1, further comprising processing the image file to create a first image file version, wherein the first image file version comprises a processed image in which a first facial image of a first user of the one or more individuals identified in the image is modified.

3. The method of claim 2, wherein the first facial image is pixelated in the first image file version or has a lower resolution in the first image file version than in the original file or both.

4. The method of claim 2, further comprising, in accordance with the control policy, allowing, modifying, or denying the action to be performed on the first image file version based at least in part on authorization instructions received from at least the first user.

5. The method of claim 1, wherein the one or more rules provide that the action can be performed on the image when each of the one or more individuals identified in the image provides authorization instructions.

6. The method of claim 1, wherein the one or more rules provide that the action can be performed on the image unless at least one of the one or more individuals identified in the image denies authorization.

7. The method of claim 1, further comprising requesting authentication of the one or more individuals identified in the image prior to requesting authorization instructions from the one or more individuals identified in the image.

8. The method of claim 7, wherein the authentication improves the accuracy of identification by the one or more facial recognition algorithms.

9. The method of claim 1, further comprising requesting confirmation of identification from the one or more individuals identified in the image prior to requesting authorization instructions from the one or more individuals identified in the image.

10. The method of claim 9, wherein the confirmation improves the accuracy of identification by the one or more facial recognition algorithms.

11. The method of claim 1, wherein the authorization instructions are provided by a first user of the one or more individuals identified in the image, wherein the first user selects a facial image of the first user in the image on a graphical user interface with a user interactive device to provide the authorization instructions.

12. The method of claim 1, wherein the action is a sharing action, downloading action, or deleting action.

13. A computer-implemented system for sharing an image, comprising:
one or more computer processors; and
a memory, communicatively coupled to the one or more computer processors, including instructions executable by the one or more processors to:
obtain an image file of an image, wherein the respective faces of one or more individuals are captured in the image;
execute one or more facial recognition algorithms to identify the one or more individuals captured in the image;
insert a personal identity control key for each of the one or more individuals identified in the image into the image file;
provide a control policy for the image file, wherein the control policy comprises one or more rules associated with the personal identity control key for each of the one or more individuals identified in the image;
receive a request to perform an action on the image file;
in accordance with the control policy, request authorization instructions from each of the one or more individuals identified in the image to perform the action on the image file;
based at least in part on authorization instructions received from at least one of the one or more individuals identified in the image, validate the satisfaction of one or more rules in the control policy to perform the action on the image file; and
based on validation, allow or deny the action to be performed on the image file.

14. The system of claim 13, wherein the memory further comprises instructions executable by the one or more processors to process the image file to create a first image file version, wherein the first image file version comprises a processed image in which a first facial image of a first user of the one or more individuals identified in the image is modified.

15. The system of claim 14, wherein the first facial image is pixelated in the first image file version or has a lower resolution in the first image file version than the resolution of the first facial image in the image file.

16. The system of claim 14, wherein the memory further comprises instructions executable by the one or more processors to, in accordance with the control policy, allow, modify, or deny the action to be performed on the first image file version based at least in part on authorization instructions received from at least the first user.

17. The system of claim 13, wherein the one or more rules provide that (i) the action can be performed on the image when each of the one or more individuals identified in the image provides authorization instructions or (ii) the action can be performed on the image unless at least one of the one or more individuals identified in the image denies authorization.

18. The system of claim 13, wherein the memory further comprises instructions executable by the one or more processors to (i) request authentication of the one or more individuals identified in the image or (ii) request confirmation of identification from the one or more individuals identified in the image prior to requesting authorization instructions from the one or more individuals identified in the image, wherein the authentication or confirmation improves the accuracy of identification by the one or more facial recognition algorithms.

19. The system of claim 13, wherein the authorization instructions are provided by a first user of the one or more individuals identified in the image, wherein the first user selects a facial image of the first user in the image on a graphical user interface with a user interactive device to provide the authorization instructions.

20. The system of claim 13, wherein the action is a sharing action, downloading action, or deleting action.

* * * * *